US006868097B1

(12) United States Patent
Soda et al.

(10) Patent No.: US 6,868,097 B1
(45) Date of Patent: Mar. 15, 2005

(54) COMMUNICATION NETWORK, AND MASTER DEVICE, SLAVE DEVICE, MULTIPLEXER AND SWITCH CONSTITUTING THE COMMUNICATION NETWORK

(75) Inventors: Keiichi Soda, Tokyo (JP); Tatsuki Ichihashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,681

(22) Filed: Sep. 30, 1999

(30) Foreign Application Priority Data

Jan. 28, 1999 (JP) .......................................... 11-020644

(51) Int. Cl.[7] ................................................ H04J 3/08
(52) U.S. Cl. .................. 370/537; 370/503; 340/825.02; 709/208; 709/252
(58) Field of Search ..................... 340/825.02; 709/201, 709/208, 220, 252; 370/230, 252–253, 270, 301, 345–350, 352–389, 395.1, 395.4, 395.41, 395.7–408, 412–414, 419–421, 448–461, 470, 503, 508, 519, 537–541, 512, 507

(56) References Cited

U.S. PATENT DOCUMENTS

| 4,156,798 A | * | 5/1979 | Doelz ......................... 370/389 |
| 4,926,423 A | * | 5/1990 | Zukowski .................... 370/540 |
| 5,043,982 A | | 8/1991 | Werner |
| 5,513,172 A | | 4/1996 | Shikama et al. |
| 5,627,832 A | * | 5/1997 | Tanaka et al. ............... 370/508 |
| 5,781,726 A | * | 7/1998 | Pereira ........................ 370/346 |
| 5,883,894 A | * | 3/1999 | Patel et al. .................. 370/438 |
| 6,198,723 B1 | * | 3/2001 | Parruck et al. ......... 370/395.41 |
| 6,246,701 B1 | * | 6/2001 | Slattery ....................... 370/503 |

FOREIGN PATENT DOCUMENTS

| JP | A55-38749 | 3/1980 |
| JP | A8-186577 | 7/1986 |
| JP | A63-226151 | 9/1988 |
| JP | A3-157032 | 7/1991 |
| JP | B2-542209 | 6/1993 |
| JP | A7-66833 | 3/1995 |
| JP | A7-123101 | 5/1995 |
| JP | A7-131465 | 5/1995 |

* cited by examiner

Primary Examiner—Alpus H. Hsu
Assistant Examiner—Justin M Philpott
(74) Attorney, Agent, or Firm—Birch, Stewart, Kolasch & Birch, LLP

(57) ABSTRACT

In a communication network in which one master device and a plurality of slave devices are connected via a multiplexer to each other in a tree form with the master device provided at the vertex, the master device specifies each of the slave devices via the multiplexer according to a round-robin. Then the slave device transmits specific information for starting used for matching the sampling time to the master device according to the specified order. Finally, the sampling time is adjusted by executing a prespecified operation according to the specific information for returning returned from the master device in response to the specific information for starting.

22 Claims, 18 Drawing Sheets

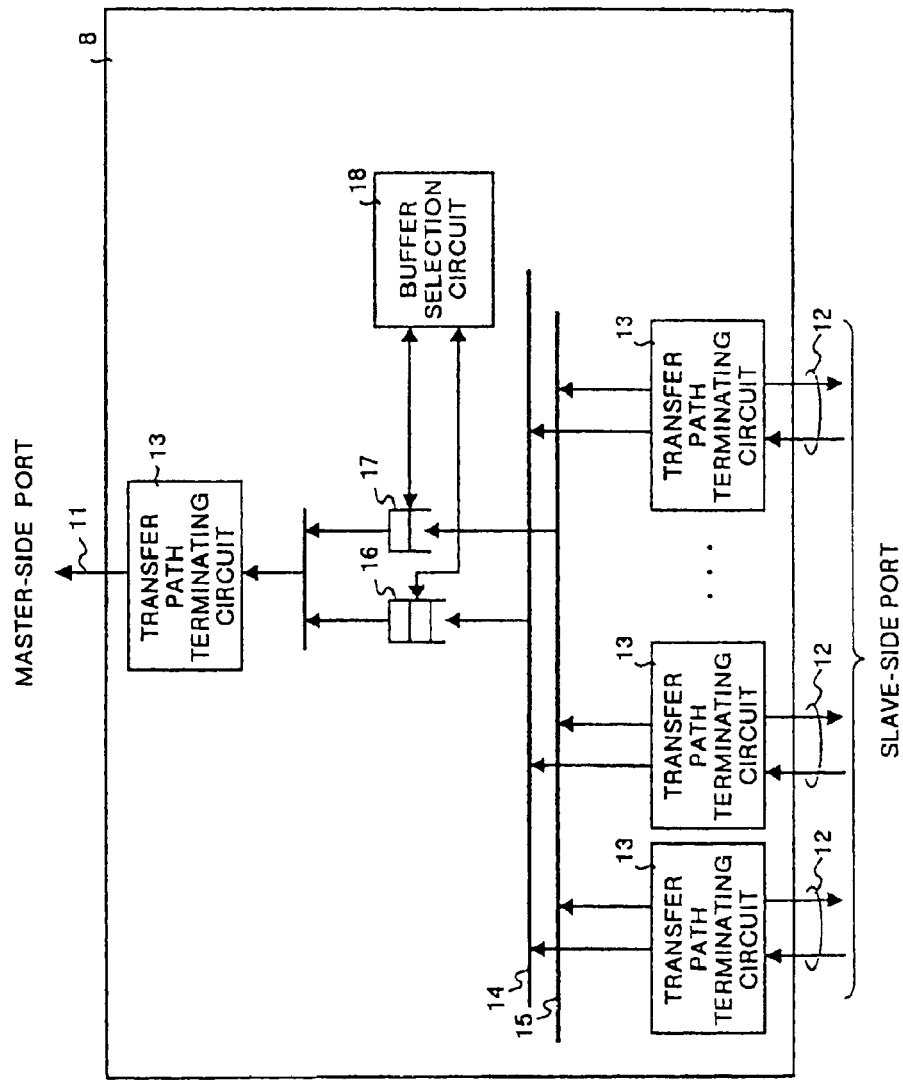

COMMUNICATION NETWORK, AND MASTER DEVICE, SLAVE DEVICE, MULTIPLEXER AND SWITCH CONSTITUTING THE COMMUNICATION NETWORK

FIELD OF THE INVENTION

The present invention relates to a communication network in which one master device and a plurality of slave devices are connected through at least one unit of multiplexer in a tree form with the master device provided at the vertex. This invention more specifically relates to a communication network in which precision in sampling time between the master device and slave device can be improved.

BACKGROUND OF THE INVENTION

A conventional type of communication network is described here. FIG. 16 is a view showing a conventional type of communication network disclosed, for instance, in Japanese Patent Publication No. HEI 5-42209. In this figure reference numeral 1 indicates a master device, and reference numeral 2 indicates a slave device. The master device 1 and slave device 2 are connected to each other with an interactive transfer path. Assuming that a sampling cycle is T, information sampled at sampling time T is transmitted to each other according to the sampling time.

In order to match the sampling time in the master device 1 to that in the slave device 2, information for matching the sampling time is periodically inserted into the sampling information for transmission. A mismatch in the sampling time may be generated during booting of the devices, or when there is a breakdown, or due to a difference in the operation clock frequency in the master device and in the slave device.

A procedure for matching the sampling time in the master device 1 to that in the slave device 2 is explained here. FIG. 17 is a view showing an example of a timing chart showing a flow of information between the master device 1 and slave device 2 in a communication network based on the conventional technology.

In FIG. 17 reference numeral 3 indicates descending sampling information transmitted from the master device 1 to the slave device 2, and reference numeral 4 indicates ascending sampling information transmitted from the slave device 2 to the master device 1. The example shown in this figure is based on the following four assumptions. The first assumption is that sampling information transmitted from the master device 1 or the slave device 2 at each local sampling time only contains the information for matching the sampling time.

The second assumption is that the master device 1 and slave device 2 repeatedly generate a sampling number having a value from 0 to 11 at each sampling cycle T and insert this sampling number into the sampling information to be transmitted. The third assumption is that sampling time in the master device 1 is offset by $\Delta T$ from that in the slave device 2 and further a sampling number in the former is offset by 6 from that in the latter. The fourth assumption is that a transfer delay time Td in the transfer path is identical in both the directions.

Flow of information between the master device 1 and the slave device 2 in a communication network based on the conventional technology will be explained while referring to FIG. 17. At first, the master device 1 transmits descending sampling information 3 including information for starting the sampling time matching to the slave device 2 at each local sampling time having the sampling number of 0.

The slave device 2 receives the descending sampling information 3 after passage of the transfer delay time Td and calculates a time interval Ts from the local sampling time (sampling number 9 in FIG. 17) just before receiving the descending sampling information 3 until the time point when the information 3 is received.

The slave 2 then transmits the ascending sampling information 4 including the calculated time interval Ts to the master device 1 at local sampling time (sampling number 10 in FIG. 17) next to that when the descending sampling information 3 is received.

Finally, The master device 1 receives the ascending information 4 after passage of the transfer delay time Td and calculates a time interval Tm from the local sampling time just before the sampling information 4 is received (sampling number 7 in FIG. 17) until the sampling information 4 is received.

As understood from the example shown in FIG. 17, a relation between the transfer delay time Td, the measured time Ts, and Tm is as expressed by the following equations:

$$Td + \Delta T = N \times T + Ts \quad (1)$$

$$Td = M \times T + Tm + \Delta T \quad (2)$$

Herein N is a number of sampling cycles from sampling time in the slave device 2 closest to the time point when the descending sampling information 3 is received by the master device 1 until the sampling time as a reference when the slave device 2 measures the time interval Ts. M is a number of sampling cycles from the sampling time in the master device 1 closest to the time point when the slave device 2 transmits the sampling information 4 until the sampling time as a reference when the master device 1 measures the time interval Tm. Accordingly, the following equation is obtained from the equations (1) and (2).

$$\Delta T = (N-M) \times T/2 + (Ts-Tm)/2 \quad (3)$$

Values of N and M in the equations (1) and (2) are obtained from a sampling number SA2 (7 in FIG. 17) at the local sampling time just before the ascending sampling information 4 is received by the master device 1 according to the following equations. For instance, when SA2 is odd, then $$M = (SA2-1)/2, \; N = (SA2-1)/2 \quad (4)$$

when SA2 is even and Tm is larger than Ts, then $$M = SA2/2, \; N = SA2/2 - 1 \quad (5)$$

when SA2 is even and Tm is smaller than Ts, then $$M = SA2/2 - 1, \; N = SA2/2 \quad (6)$$

Accordingly the master device 1 decides $\Delta T$ through the equations (3) to (6), and adjusts the local sampling time in such a way that $\Delta T$ becomes zero. In the example shown in FIG. 17, since SA2 is equal to 7, N becomes 3 and M becomes 3, and $\Delta T$ is decided through the equation of $\Delta T = (Ts-Tm)/2$. Fine adjustment of sampling time in the master device 1 and slave device 2 is executed as described above.

A method of matching the sampling number for roughly adjusting the sampling time is explained here. For instance, delay ϵ of a sampling number in the master device 1 from that in the slave device 2 is decided from the sampling number RA1 (10 in FIG. 17) inserted by the slave device 2 into the ascending sampling information and SA2 explained above through the following equation:

$$\epsilon = RA1 - (SA2+1)/2 \qquad (7)$$

The master device 1 decides ϵ through the equation (7), and advances the local sampling number in such a way that ϵ becomes zero. In the example of FIG. 17, SA2 is 7 and RA1 is 10 so that ϵ becomes 6. When ϵ obtained through the equation (7) is a negative, it indicates that a sampling number in the master device 1 is faster than that in the slave device 2. With the procedure described above, it is possible to match the sampling number in the master device 1 to that in the slave device 2.

A method of expanding a conventional type of communication network as described above to a large-scale communication network in which sampling time in a master device is matched to that in each of a plurality of slave devices and also the master device collects sampling information from the plurality of slave devices is explained here. As shown, for instance, in FIG. 1, one or more units of packet multiplexers are provided between the master device and the plurality of slave devices to form a tree-formed large-scale communication network.

In FIG. 1, reference numeral 6 indicates a master device for collecting sampling information from each of the slave devices and executing communications for matching the sampling time according to that in each slave device. Reference numeral 7 indicates a plurality of slave devices each for transmitting the sampling information to the master device 6 and also executing communications for matching the sampling time. Reference numeral 8 indicates packet multiplexer. Two packets as explained below are transacted between the master device 6 and slave device 7.

The first packet is a general packet indicating the sampling information, and the second packet is a specific packet used for communications for matching the sampling time. Packets transacted between the master device 6 and slave device 7 are classified to general packets and specific packets so that communications for matching the sampling time is preferentially executed prior to collection of sampling information and a transfer delay time in transfer from the master device to the slave device is equalized to that in the reverse direction to satisfy the equation (3).

For instance, as a method of preferentially executing communicating for matching the sampling time, there is a method of providing a buffer for each priority in the packet multiplexer 8. As an example, FIG. 18 shows the internal configuration of the packet multiplexer 8 based on the conventional technology disclosed in Japanese Patent Laid-Open Publication No. HEI 7-131465.

In FIG. 18, reference numeral 11 indicates a master-side port, 12 indicates a slave-side port, 13 indicates a transfer path terminating circuit for terminating a packet transmitted to or from a transfer path at a physical layer level. Reference numeral 14 indicates a general packet multiplexing bus, 15 indicates a specific packet multiplexing bus. Reference numeral 16 indicates a general packet buffer for storing therein a general packet received from the slave-side port, reference numeral 17 indicates a specific packet buffer for storing a specific packet received from the slave-side port, and reference numeral 18 indicates a buffer selection circuit. It should be noted that a circuit for relay from the master-side port to the slave-side port is not shown.

A method of priority control for the packet multiplexer 8 based on the conventional technology is explained here. At first, the transfer path terminating circuit 13 provided in the slave-side port 12 classifies the packets received from the slave-side port 12 to general packets and specific packets. The classified general packets are stored via the general packet multiplexing bus 14 in the general packet buffer 16, while the classified specific packets are stored via the specific packet multiplexing bus 15 in the specific packet buffer 17. When a specific packet is stored in the specific packet buffer 17, the buffer selection circuit 18 controls the specific packet buffer 17 so that the specific packet is preferentially outputted to the master-side port 11 prior to the output of the general packets stored in the general packet buffer 16.

By executing the method for priority control to all of the slave devices, in the communication network based on the conventional technology, in communications for setting sampling time, a transfer delay time in the master device 6 can substantially be matched with that in the slave device 7.

In the communication network based on the conventional technology, however, following problems occur when the packet multiplexer as described above is used.

For instance, when a specific packet arrives from another slave-side port while a general packet from a slave-side port is being relayed to a master-side port, the time required for queuing until relay of the specific packet can be relayed is at the maximum a time required for relaying one general packet and at the minimum zero, and thus the queuing time varies within this range.

Further, when specific packets arrive from a plurality of slave-side ports simultaneously, a time for queuing required until a specific packet is relayed is at the maximum a product of a time required for relaying one packet by a number of slave-side ports and at the minimum zero, and thus the time varies within this range.

As described above, fluctuation of a transfer delay time (the time required for the above explained queuing) increases in proportion to a number of packet multiplexers through which specific information passes through.

Briefly the problem described above can be expressed by the following equation:

Fluctuation of a transfer delay time due to queuing for transmission from a slave device to a master device=(a time required for the relay of General packet+a time required for the relay of specific packet×a number of slave-side ports)×number of packet multiplexers which pass the specific information (8)

On the other hand, a time for queuing when a specific packet is relayed from a master-side port in a packet multiplexer to a slave-side device is zero, namely fluctuation of a transfer delay time due to queuing for relay from a master device to a slave device is zero regardless of a number of packet multiplexers through which a specific packet passes.

Accordingly, the equation (3) is not satisfied because a transfer delay time from a master device to a slave device is different from that in the reverse direction, and in addition, a correction can not be added to equation (3) because of fluctuation of a transfer delay time due to a time required for packet relay from a master device to a slave device as expressed by the equation (8). Therefore, there is a problem that precision in sampling time for packet relay between a master device and slave devices equivalent to what has been expressed in the equation (8).

It should be noted that a major portion of fluctuation in a delay time in transfer between devices is generated due to the time required for queuing as described above, and in addition, as a phase of an operating clock varies device by device, so that the delay is generated also due to adjustment of the phase. However, the percentage is small as compared to that due to the time required for queuing.

SUMMARY OF THE INVENTION

It is an object of the present invention to provide a communication network and a master device for the network, a slave device, a multiplexer and a switch each constituting the communication network which can improve sampling time in information transfer between the master device and each of the slave devices by eliminating fluctuation in a transfer delay time with respect to a specific packet due to a time required for queuing as well as by matching at a high level a transfer delay time in the master device to that in a slave device.

With the present invention, the master device executes polling for each of the slave devices via the multiplexer, and each of the slave devices transmits specific information for starting to the master device according to a polling order and matches the sampling time by executing a prespecified operation according to specified information for returning returned from the master device. With this operation, fluctuation in a transferring a specific packet from the slave device to the master device due to queuing can be eliminated.

With the present invention, general information can be transmitted at each sampling time, so that data communications between devices can be realized.

With the present invention, under control by the master-destined information selecting unit, any one of the master-destined general information receiving unit and master-destined specific information is selected, and output therefrom to the master device is allowed according to a prespecified method. With this operation, specific information can be outputted at constant timing, and fluctuation in a transfer delay time due to a time required for packet transfer between a slave device to a master device can be eliminated.

With the present invention, a delay time in relay from a point of time when a header of specific information arrives at a slave-side port in the multiplexer under a point of time when the header of the specific information is outputted from the master-side port is always equal to a sum of a specific constant time and other constant processing delay time (such as a time for passing through a transfer path terminating circuit or the like), so that fluctuation in a delay time in relay due to queuing does not occur. With this feature, fluctuation of a delay time in transferring specific information from the slave device to the master device due to queuing can be eliminated.

With the present invention, the transmission selecting unit selects any one of the general information transreceiving unit and a specific information transreceiving unit, and allows output therefrom, hence, controls can be provided so that fluctuation in a time required for transmission from the local sampling time until transmission of specific information can be eliminated in both the master device and slave devices.

With the present invention, a delay time in processing from a point of time when the specific information transreceiving unit requests transmission until a point of time when a header of the specific information is outputted is always equal to a certain constant period of time and other constant processing time (such as a time required for passing through the transfer path terminating circuit or the like) regardless of how general information is being relayed, so that fluctuation in a delay time does not occur. Also the processing delay time is identical in both the master device and each slave device. With this feature, precision of sampling time in the master device and in each slave device can further be improved.

With this information, when general information or specific information is received from a master-side port, the general information or specific information is accumulated after input thereof into the slave-destined information receiving unit is started for a specified period of time decided by a time required for transmission of specific information, and the accumulated information is outputted from the slave-destined information receiving unit after passage of the specified period of time. With this feature, in the communication network, a delay time in transferring specific information in the master device and that in the slave device can be matched to each other with high precision.

With the present invention, when specific information has not been received from the master-side port, output from the slave-destined general information receiving unit is allowed, and when specific information has been received from the master-side port, output of the specific information in inhibited for a specified period of time decided by a time required for transmission of the specific information after input thereof into the slave-destined specific information receiving unit is started, and further new output from the slave-destined general information receiving unit is inhibited for a specified period of time, and after passage of the specified period of time, output from the slave-destined specific information receiving unit is allowed. With this feature, in the communication network according to the present invention, a delay time in transfer in the master device can be matched to that in the slave device with high precision, and further a delay time in transferring general information from the master device to the slave device can be reduced.

With the present invention, when the master-destined information selecting unit has received specific information from any of the slave-side ports, new output from the management information transreceiving unit is inhibited for a specified period of time, and output from the master-destined specific information receiving unit is allowed after passage of the specified period of time, and when the slave-destined information selecting unit has received specific information from the master-side port, new output from the management information transreceiving unit is inhibited for a specified period of time, and output from the slave-destined specific information receiving unit is allowed after passage of the specified period of time. With this feature, in this communication network, even when the packet multiplexer transmits or receives management information, a delay time in transferring specific information in the master device and that in the slave device can be matched to each other with high precision.

With the present invention, each of the second multiplexers does not relay specific information and functions as a slave device with respect to a master device at a higher level and functions as a master device with respect to each of the devices at a lower level, and thus sampling time is adjusted to the upper device and lower device in two stages. With this feature, in this communication network, even when a number of slave devices increases, precision of sampling time in each slave device can be improved.

With the present invention, under controls by the master-destined information selecting unit and slave-destined information selecting unit, general information and specific information are selected, and output thereof to each device is allowed according to a prespecified method. With this feature, specific information can be outputted at constant timing, and fluctuation of a delay time in transfer due to queuing between the slave device and master device can be eliminated.

With the present invention, a delay time in processing from a point of time when the master-side specific information transreceiving unit or slave-side specific information transreceiving unit requests transmission until a point of time when a header of the specific information is outputted from the master-side port or slave-side port is always equal to a sum of a certain specified period of time and other constant processing delay time (such as a time required for passing through the transfer path terminating circuit or the like) regardless of how general information is being relayed, so that fluctuation in a delay time due to queuing does not occur. Further, there occurs no fluctuation in a delay time in transferring specific information due to a time required for queuing in the master device nor in the second multiplexer, and further there occurs no fluctuation in a delay time in transfer between the second multiplexer and slave device. Because of this feature, in the communication network according to the present invention, a transfer delay time in the master device can be matched to that in the second multiplexer with high precision and further a transfer delay time in the second multiplexer can be matched to that in the slave device with high precision with precision of sampling timing in each slave further improved even if a number of slave devices in the communication network increases.

With the present invention, the master device specifies each of the slave devices via a multiplexer and a third multiplexer according to a round-robin, and then each of the slave devices transmits specific information for starting according to the specified order and executes a prespecified operation according to specific information for returning returned from the master device in response to the specific information for starting for adjusting sampling time. With the feature, even if there are a plurality of master devices each collecting sampling information from the slave device, a delay time in transferring specific information in the master device for setting sampling time and that in each slave device can be matched to each other with high precision.

With the present invention, general information or specific information is selected under controls by the master-destined information selecting unit, slave-destined information selecting unit, and second master-destined information selecting unit, and output thereof to each device is allowed according to a prespecified method. With this feature, output of specific information can be executed at constant timing, and fluctuation in a transfer delay time due to a time required for queuing in a slave device or a master device can be eliminated.

With the present invention, a time required for relay between a master-side port and a slave-side port when relaying specific information with a third multiplexer is always equal to a sum of a constant period of time and other constant processing delay time (such as a time required for passing through the transfer terminating circuit or the like) regardless of how general information is being relayed, and there occurs no fluctuation due to a time required for queuing. Also a delay time in transferring a specific packet in the master device can be matched to that in the slave device with high precision. With this feature, in the communication network according to the present invention, even when a plurality of second master devices are provided each for collecting sampling information from a slave device, precision in sampling time in the master device can be matched to that in the slave device with high precision.

With the present invention, a third master device specifies each of the slave devices via a multiplexer, a fourth multiplexer, and a third multiplexer according to a round-robin, and each of the slave devices transmits specific information for starting according to the specified order and executes a prespecified operation according to specific information for returning returned from the master device in response to the specific information for starting for adjusting the sampling time. With this feature, in the communication network according to the present invention, a small-scale communication network formed with a master device and a plurality of slave devices are provided, and even when each master device collects sampling information from a slave device within the local small-scale communication network or from that outside the local small-scale communication network, a delay time in transferring a specific packet in a master device for adjusting sampling time can be matched to that in the slave device with high precision.

With the present invention, general information or specific information is selected under controls by the master-destined information control unit, slave-destined information selecting unit, and switch-destined information selecting unit, and output thereof to each device is allowed according to a prespecified method. With this feature, output of specific information can be executed at constant timing, and fluctuation in a transfer delay time due to a time required for queuing in the slave device or in the master device can be eliminated.

With the present invention, a time required for relay between a master-side port and a slave-side port when relaying specific information with a fourth multiplexer is always equal to a sum of a constant period of time and other constant processing delay time (such as a time required for passing through the transfer terminating circuit or the like) regardless of how general information is being relayed, and there occurs no fluctuation due to a time required for queuing. Also a delay time in transferring a specific packet in the master device can be matched to that in the slave device with high precision. With this feature, in the communication network according to the present invention, a plurality of small scale networks comprising a second master devices and a plurality of slave devices are provided and even when each sampling information is collected from the slave devices inside the small scale network or from the slave devices outside the small scale network, precision in sampling time in the master device can be matched to that in the slave device with high precision.

With the present invention, a third master device specifies each slave device via a switch, a multiplexer, and a multiplexer according to a round-robin, and then each slave device transmits specific information for starting according to the specified order and executes a prespecified operation according to specific information for returning returned from the master device in response to the specific information for starting for adjusting sampling time. With this feature, in the communication network according to the present invention, there are provided a plurality of small-scale communication network each formed with a master device and a plurality of slave devices, and even when each master device collects sampling information from a slave device within the local small-scale communication network or that outside the local small-scale communication network, a delay time in transferring a specific packet in the master device for setting sampling time and that in each slave device can be matched to each other with high precision.

With the present invention, general information or specific information is selected under control by the master-destined information selecting unit, second master-destined information selecting unit, and switch, and output thereof to each device is allowed according to a prespecified method. With this feature, output of specific information can be executed at constant timing, and fluctuation in a transfer delay time due to a time required for queuing in the slave device and in the master device can be eliminated.

With the present invention, a relay time between a master-side port and a slave-side port when a switch relays specific information is always equal to a sum of a certain constant period of time and other constant processing delay time (such as a time required for passing through the transfer path terminating circuit or the like) regardless of how general information is being relayed, and there occurs no fluctuation due to a time required for queuing. Also a delay time in transferring specific information in the master device and that in the slave device can be matched to each other with high precision. With this feature, even when each of the second master devices collects sampling information from a slave device within the local small-scale network or that outside the local small-scale network, precision of sampling time in the master device as well as that in the slave device can be improved.

With the present invention, even when general information or specific information has a variable length, a specified period of time in which output of specific information is inhibited is set to that decided by a time required for transmission of information with present maximum length according to operations of the master-destined information selecting circuit, so that precision of sampling time in the master device and that in each slave device can be improved.

With the present invention, the transmission selecting unit selects either one of a general information transreceiving unit and specific information transreceiving unit and allows output therefrom, and because of this feature output of the specific information can be controlled so that fluctuation of a delay time in transmission with an external slave device can be eliminated.

With the present invention, a delay time in an operating sequence from a point of time when the specific information receiving unit requests transmission until a point of time when header of the specific information is outputted from the transreceiving port is always equal to a certain constant period of time and other constant processing delay time (such as a time required for passing through the transfer path terminating circuit or the like), and because of this feature fluctuation in a sequence of operations with an external slave device can be eliminated.

With the present invention, the transmission selecting unit selects wither one of the general information transreceiving unit and specific information transreceiving unit and allows output therefrom, and because of this feature output of the specific information can be controlled so that fluctuation in a time required for communications with an external master device is eliminated.

With the present invention, a delay time in processing from a point of time when the specific information transreceiving unit requests transmission until a point of time when a header of the specific information is outputted from the transreceiving port is always equal to a sum of a certain constant period of time and other constant processing delay time (such as a time required to pass through the transfer path terminating circuit or the like), and because of this feature, fluctuation in communications with an external master device can be eliminated.

With the present invention, under control by the master-destined information selecting unit, any one of the master-destined general information receiving unit and master-destined specific information receiving unit is selected, and output therefrom is allowed according to a prespecified method. With this feature, specific information can be outputted at constant timing, and fluctuation in a transfer delay time due to a time required for queuing in the slave device and in the master device can be eliminated.

With the present invention, a relay delay time from a point of time when a header of specific information arrives at a slave-side port of a multiplexer until a point of time when the header of specific information is outputted from the master-side port is always equal to a certain constant period of time and other constant processing delay time (such as a time required for passing through the transfer path terminating circuit or the like) regardless of how general information is being relayed, and fluctuation in a relay delay time due to a time required for queuing can be eliminated.

With the present invention, when general information or specific information is received from the master-side port, the general information or specific information is accumulated for a specified period of time decided by a particular transmission time after input of the general information or specific information is started, and the accumulated information is outputted from the slave-destined information receiving unit after passage of the specified period of time.

With the present invention, when specific information has not been received from the master-side port, output from the slave-destined general information receiving unit is allowed, and when specific information has been received from the master-side port, output of specific information is inhibited for a specified period of time decided by a particular transmission time after input to the slave-destined specific information receiving unit is inhibited, and further new output from the slave-destined general information receiving unit is inhibited for a specified period of time, and then output from the slave-destined specific information receiving unit is allowed after passage of the specified period of time. With this feature, a delay time in transferring the specific information in an external master device and that in the slave device can be matched to each other with high precision, and further a delay time in transferring general information from the master device to the slave device can be reduced.

With the present invention, when the master-destined information selecting unit has received from any of the slave-side ports, new output from the management information transreceiving unit is inhibited for a specified period of time, and output from the master-destined specific information receiving unit is allowed after passage of the specified period of time, and further when the slave-destined information selecting unit has received from the master-side port, new output from the management information transreceiving unit is inhibited for a specified period of time, and output from the slave-destined specific information receiving unit is allowed after passage of the specified period of time. With this feature, when a packet multiplexer sends or receives management information, a delay time in transferring specific information in the slave device and that in the master device can be matched to each other with high precision.

With the present invention, under controls by the master-destined information selecting unit and slave-destined information selecting unit, general information and specific information are selected and output thereof to each device is allows according to a prespecified method. With this feature, specific information can be outputted at constant timing, and fluctuation in a transfer delay time due to a time required for queuing in the slave device and that in the master device can be eliminated.

With the present invention, a delay time in processing from a point of time when the master-side specific information transreceiving unit or slave-side specific information transreceiving unit requests transmission until a point of time when a header of the specific information is outputted from the master-side port or slave-side port is always equal to a certain constant period of time and other constant processing delay time (such as a time required for passing through the transfer path terminating circuit or the like) regardless of how general information is being relayed, so that fluctuation in a delay time due to a time required for queuing can be eliminated.

With the present invention, under controls by the master-destined information selecting unit, slave-destined information selecting unit, and second master-destined information selecting unit, general information and specific information are selected, and output thereof to each device is allowed according to a prespecified method. With this feature, output of specific information can be executed at constant timing, and a transfer delay time due to a time required for queuing in the slave device and in the master device can be eliminated.

With the present invention, a relay time between the master-side port and slave-side port when relaying specific information with a third multiplexer is always equal to a sum of a certain constant period of time and other constant processing delay time (such as a time required for passing through the transfer path terminating circuit or the like) regardless of how general information is being relayed, so that fluctuation in a delay time due to a time required for queuing can be eliminated.

With the present invention, under controls by the master-destined information control unit, slave-destined information selecting unit, and switch-destined selecting unit, general information or specific information is selected and output thereof to each device is allowed according to a prespecified method. With this feature, output of specific information can be executed at constant timing, and fluctuation in a transfer delay time due to a time required for queuing in the slave and in the master device can be eliminated.

With the present invention, a relay time between the master-side port and slave-side port when relaying specific information with a fourth multiplexer is always equal to a sum of a certain constant time and other constant processing time (such as a time required for passing through the transfer path terminating circuit or the like) regardless of how general information is being relayed), so that fluctuation in a delay time due to a time required for queuing can be eliminated.

With the present invention, under controls by the master-destined information control, second master-destined information selecting unit and switch, general information and specific information are selected, and output thereof to each device is outputted according to a prespecified method. With this feature, output of specific information can be executed at constant timing, and a transfer delay time due to a time required for queuing in the slave device and in the slave device can be eliminated.

With the present invention, a relay time between the master-side port and slave-side port when relaying specific information with a switch is always equal to a sum of a certain constant period of time and other constant processing delay time (such as a time required for passing through the transfer path terminating circuit or the like), so that fluctuation in a delay time due to a time required for queuing can be eliminated.

Other objects and features of this invention will become apparent from the following description with reference to the accompanying drawings.

BRIEF DESCRIPTION OF THE DRAWINGS

FIG. 18 shows an internal configuration of a packet multiplexer based on the conventional technology.

DESCRIPTION OF THE PREFERRED EMBODIMENTS

Detailed description is made hereinafter for the embodiments of a communication network according to the present invention as well as of a master device, a slave device, a multiplexer and a switch used in the communication network. It should be noted that the present invention is not limited to the embodiments described herein.

Figure 1:
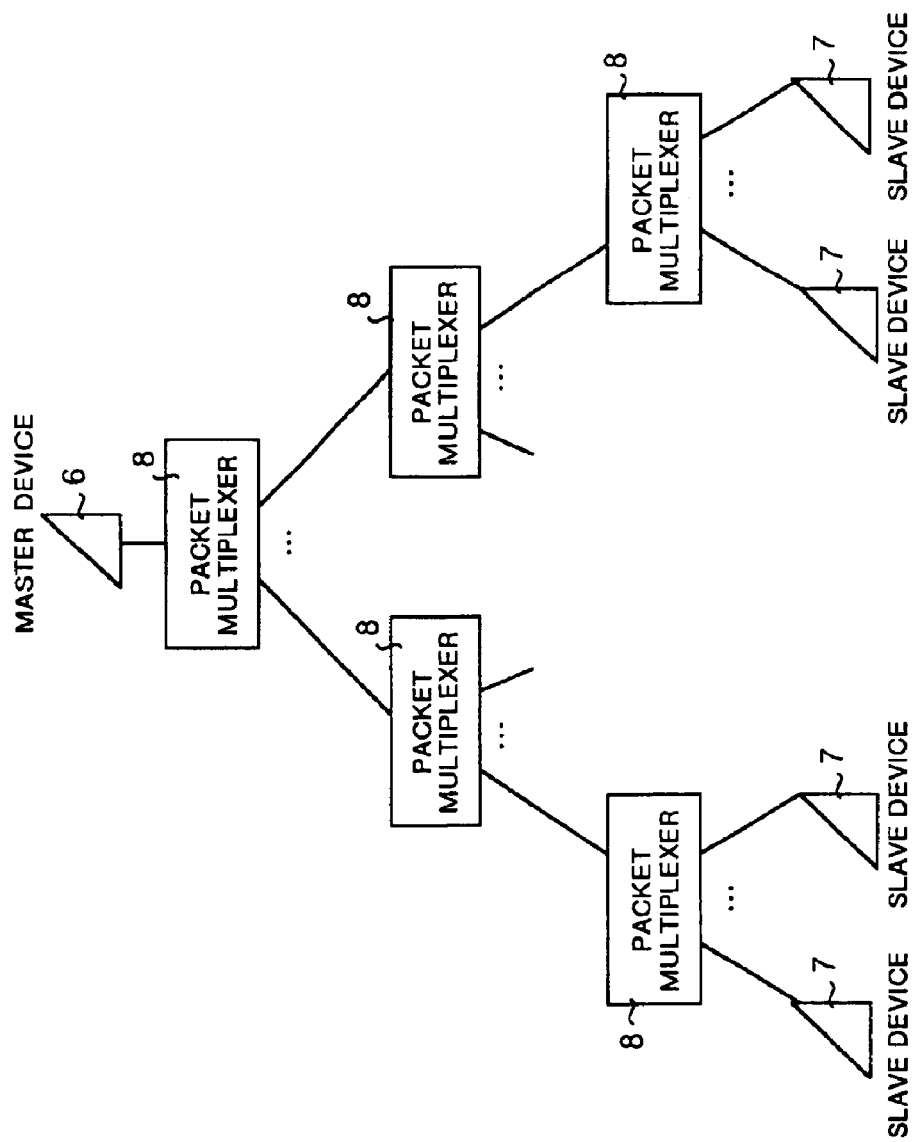
FIG. 1 shows a general configuration of a communication network according to the present invention.

FIG. 1 shows a configuration of the communication network according to the present invention. It should be noted that, in this embodiment, as shown in FIG. 1, one or more units of packet multiplexers are provided between a master device and a plurality of slave devices to form a tree-formed large-scale communication network.

In FIG. 1, reference numeral 6 indicates a master device for collecting sampling information from each of the slave devices and executing communications for matching the sampling time according to that in each slave device. Reference numeral 7 indicates a plurality of slave devices each for transmitting the sampling information to the master device 6 and also executing communications for matching the sampling time according to that in the master device. Reference numeral 8 indicates a packet multiplexer. Two packets as explained below are transacted between the master device 6 and the slave device 7. The first packet is a general packet indicating sampling information, and the second packet is a specific packet used for communications for matching sampling times.

The packets transacted between the master device 6 and slave device 7 are classified into general packets and specific packets in order to establish the equation (3) by preferentially executing communications for matching the sampling time prior to collection of sampling information and equalizing a transfer delay time in the master device to that in the slave device.

It is an object of the communication network according to the present embodiment to eliminate a delay time in transferring a specific packet due to a time required for queuing from the slave device to the master device.

Operations of each of the devices constituting the communication network shown in FIG. 1 are explained below. Each slave device 7 transmits a general packet at a cycle prespecified for each slave device to the master device 6. It should be noted that, so long as the cycle is followed, transmission may be made at any time.

Figure 17:
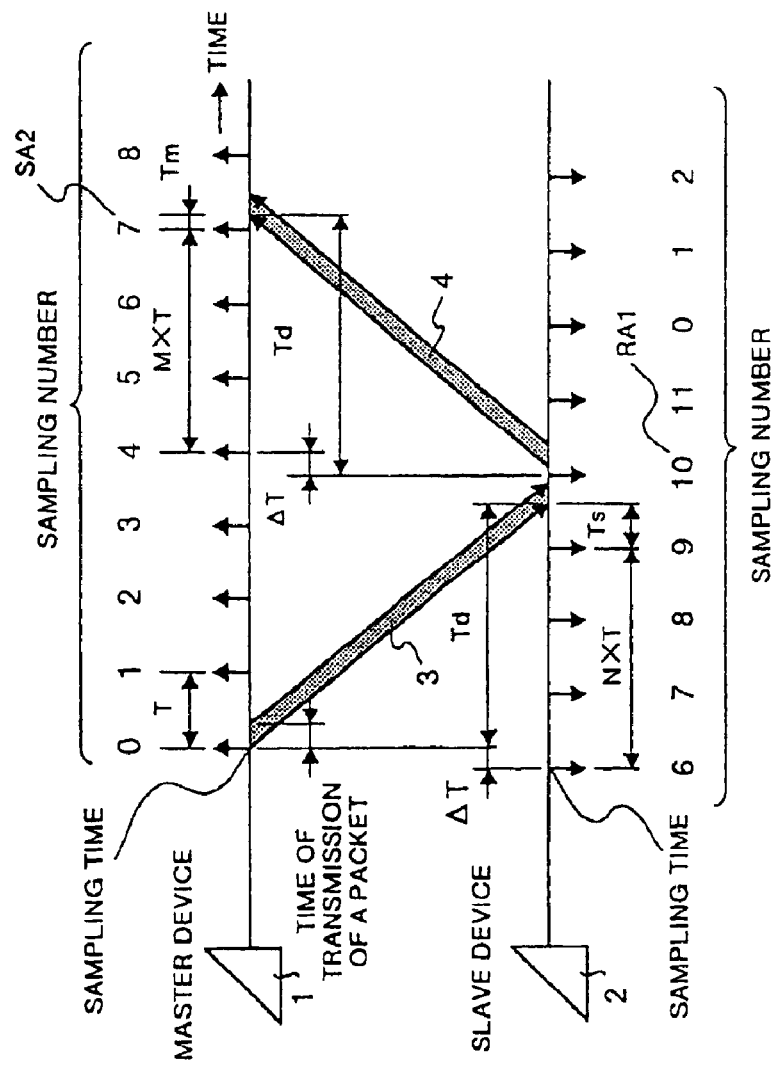
FIG. 17 is an example of a timing chart showing a flow of information between a master device and slave devices in the communication network based on the conventional technology.

The master device 6 specifies a slave device 7 according to a round-robin (this operation is described as polling hereinafter), and the polled slave device 7 transmits a specific packet to the master device 6. A flow of specific packet transaction is the same as that shown in the timing chart showing a flow of communications for sampling time matching in the conventional type of communication network shown in FIG. 17 excluding the point that functions executed by the master device and slave devices are contrary to those shown in the timing chart.

Namely, the polled slave device 7 transmits a specific information for starting the sampling time matching to the master device 6 according to the local sampling time, and the master device 6 having received the specific packet returns a specific packet to the slave device 7 according to the local sampling time. Further, the slave device 7 having received the specific packet returned from the master device computes ΔT, and adjusts the sampling time and the sampling number (Refer to description of the communication network based on the conventional network).

Accordingly, because of the polling as described above, maximum two specific packets can simultaneously exist on the communication network. It is assumed herein that the general packet and the specific packets transacted between the master device 6 and slave device 7 have the same and fixed packet length. A control area is provided in a header of the general packet and the specific packet, and an identification bit for determining whether the packet is a general packet or a specific packet is provided at a head of this control area.

Figure 2:
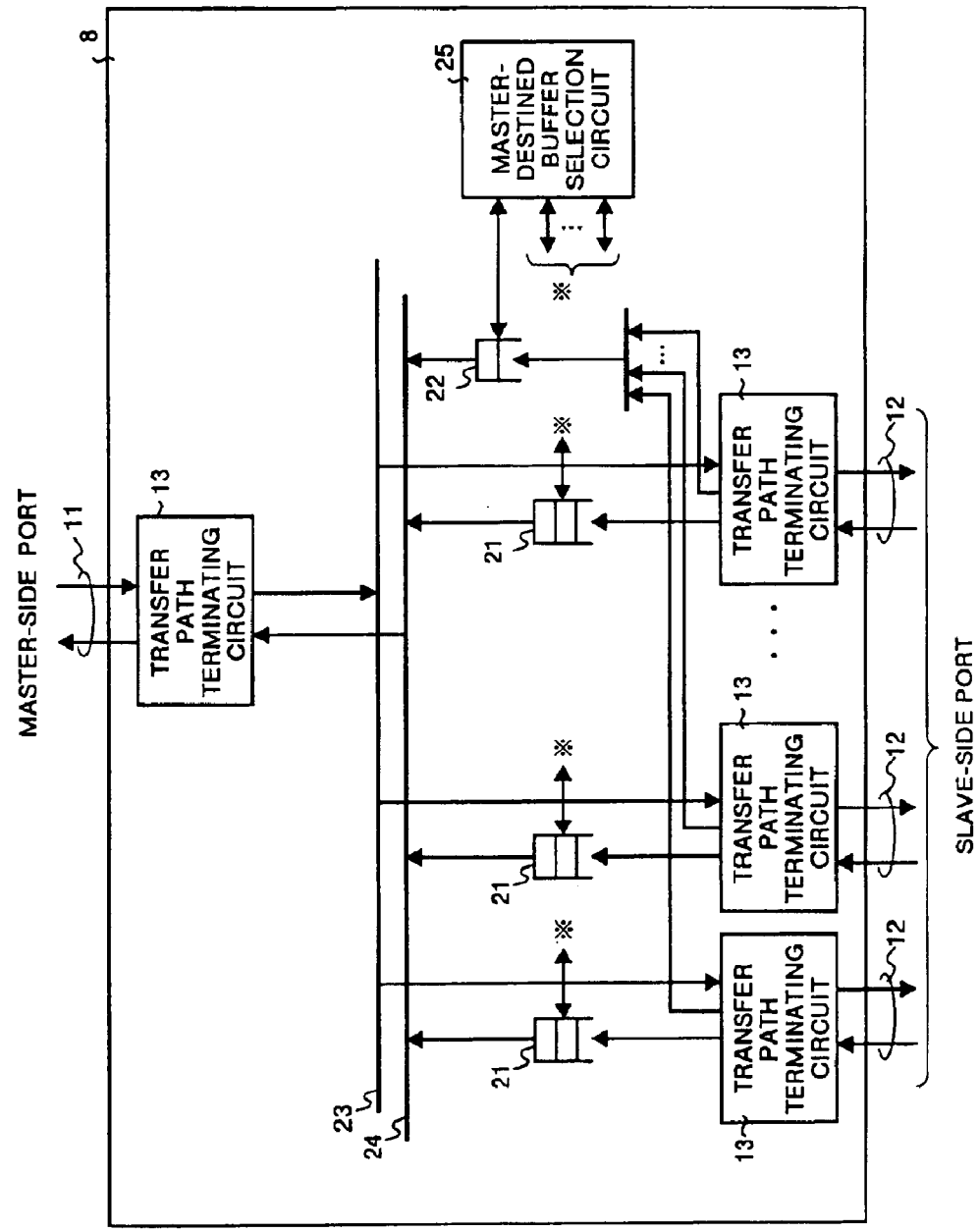
FIG. 2 shows the internal configuration of a packet multiplexer according to Embodiment 1.

FIG. 2 shows an internal configuration of the packet multiplexer 8 in this embodiment. In this figure, reference numeral 21 indicates a master-destined general packet buffer provided in each slave-side port 12, reference numeral 22 indicates a master-destined specific packet buffer provided for all of the slave-side ports 12. Reference numeral 23 indicates a packet broadcasting bus for broadcasting a packet from the master-side port 11 to all of the slave-side ports 12, reference numeral 24 indicates a packet multiplexing bus for transmitting a packet from all of the slave-side ports 12 to the master-side port 11. Reference numeral 25 indicates a master-destined buffer selection circuit for selecting a master-destined buffer.

Operations of the packet multiplexer according to this embodiment are explained below with reference to FIG. 2. For instance, when a general packet or a specific packet has been received from the master-side port 11, the packet multiplexer 8 broadcasts the packet via the packet broadcasting bus 23 to all of the slave-side ports 12. On the other hand, when a general packet or a specific packet has been received from each slave-side port 12, at first the transfer path terminating circuit 13 in the packet multiplexer 8 refers to the identification bit in the control area of the packet.

When the identification bit indicates a general packet, then the general packet is once stored in the master-destined general packet buffer 21 provided to the slave-side port 12, and when the identification bit indicates a specific packet, then the specific packet is once stored in the master-destined specific packet buffer 22. Each of these buffers transmit the packet received from the master-side port 11 via the packet multiplexing bus 24 after getting a permissions from the master-destined buffer selection circuit 25.

Operations of the master-destined buffer selection circuit 25 are explained below. For instance, when a specific packet is not stored in the master-destined specific packet buffer 22, the master-destined buffer selection circuit 25 selects any one of the master-destined general packet buffers 21 in which the general packet is stored according to a round-robin, and allows an output therefrom. Even if the entire packet is not stored in each of the buffers, when storage of a header of the packet has been started, it is regarded that the entire packet has been stored in the buffer.

When storage of a header of a specific packet in the master-destined specific packet buffer 22 has been started, the master-destined buffer selection circuit 25 inhibits output of the specific packet for a specified period of time until a point of time when the entire specific packet has been stored in the master-destined specific packet buffer 22. This specified period of time is the time required for transmission of one packet. During this specified period of time, if output of a general packet from other master-destined general packet buffer 21 is in process then the output is continued but a new output is inhibited.

After passage of the specified period of time, the master-destined buffer selection circuit 25 gives a preference to the output from the master-destined specific packet buffer 22 with respect to the output from the master-destined general packet buffers 21.

Figure 3:
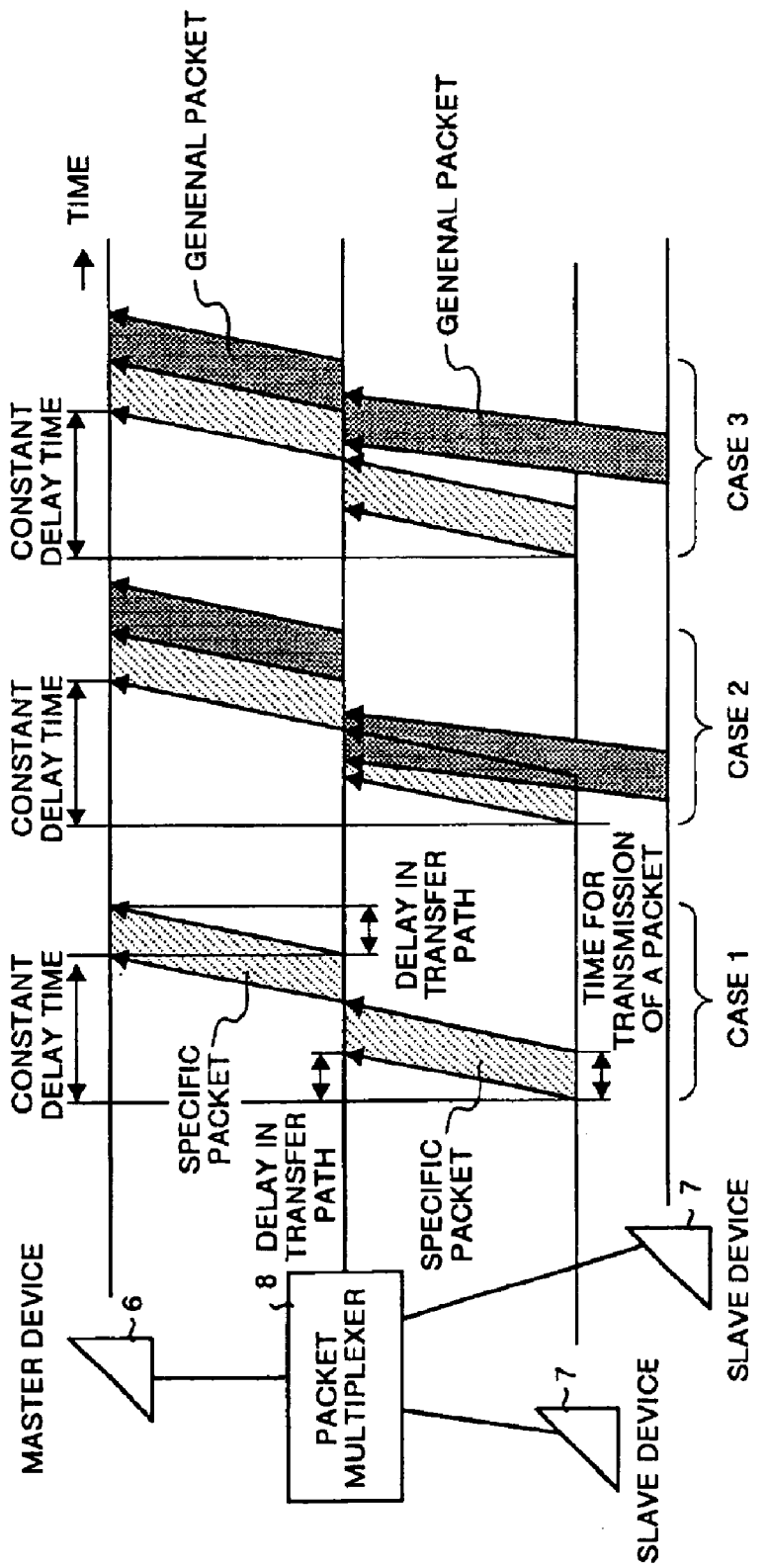
FIG. 3 is an example of a timing chart of a flow of a specific packet from a slave device 7 to a master device 6.

FIG. 3 is a timing chart showing a flow of a specific packet from the slave device 7 to the master device 6. FIG. 3 shows an example of a delay time when a specific packet is transmitted from the slave device 7 to the master device 6 in a communication network in which one master device 6 and two slave devices 7 are connected to each other with one unit of packet multiplexer 8.

Case 1 in FIG. 3 is a case in which only a specific packet is relayed in the packet multiplexer 8. Case 2 is a case in which a general packet also arrives during a period of time required for waiting for completion of transmission of a packet as a whole from a point of time when a specific packet arrives in the packet multiplexer 8, and Case 3 is a case in which a general packet arrives while a specific packet is being transmitted after a specified period of time for waiting completion of transmission of one packet as a whole after the specific packet arrives in the packet multiplexer 8.

In any of the cases, a delay time in transferring a specific packet from the slave device 7 to the master device 6 is equal to:

a delay in a transfer path from the slave device 7 to the packet multiplexer 8

+a specific period of time required for transmission of one packet as a whole

+delay due to specific processing in the packet multiplexer 8

+a delay in a transfer path from the packet multiplexer 8 to the master device 6. Thus the delay time is constant. It should be noted that a delay time due to specific processing in the packet multiplexer 8 is not shown in FIG. 3.

With the procedure as described above, in the present embodiment, a delay time in relay from the point of time when a header of a specific packet arrives in the slave-side port 12 of the packet multiplexer 8 until a point of time when the header of the specific packet is outputted from the master-side port 11 is always equal to a constant period of time required for transmission of one packet and other constant processing delay time (such as a time required for passing through a transfer path terminating circuit or the like), so that a delay in relay due to queuing does not occur. Similarly, a delay in transferring a specific packet from the slave device 7 to the master device 6 due to queuing does not occur.

On the other hand, a delay time in relaying a specific packet to the packet multiplexer in the reverse direction, namely a delay time in relaying from the master-side port 11 to the slave-side port 12 does not fluctuate due to queuing because there is no conflict with a general packet and only a constant processing delay time is required. Accordingly, there occurs no fluctuation of a delay time in transferring a specific packet from the master device 6 to the slave device 7.

In order to match a delay time in transfer from the slave device 7 to the master device 6 due to queuing to a delay time in transfer from the master device 6 to the slave device 7 due to queuing, a delay time in transferring a specific packet from the slave device 7 to the master device 6 is longer than a delay time in transfer in the reverse direction by a constant period of time required for transmission of one packet plus a time required for passing through a plurality of multiplexers, so that the slave device may recognize the difference previously (the difference is set in the slave device beforehand) and computes ΔT through the equation (3) described above according to the difference. By computing ΔT according to the method as described above, it is possible to improve the precision in the sampling time between the master device and slave device.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

Configuration of the communication network according to this Embodiment 2 is explained with the help of FIG. 1. It should be noted that the same reference numerals are assigned to the same components as those in Embodiment 1 and description thereof is omitted herein. Also in this Embodiment 2, types of packets to be treated, a flow of sampling time adjustment between the master device 6 and each slave device 7, and operations of the packet multiplexer 8 are the same as those in Embodiment 1. Herein operations of the master device 6 and slave device 7 when transmitting a packet are different from those in Embodiment 1.

It is an object of the communication network according to this embodiment to eliminate fluctuation in a transmission delay time from the local sampling time until transmission of a specific packet between the master device and slave device.

Figure 4:
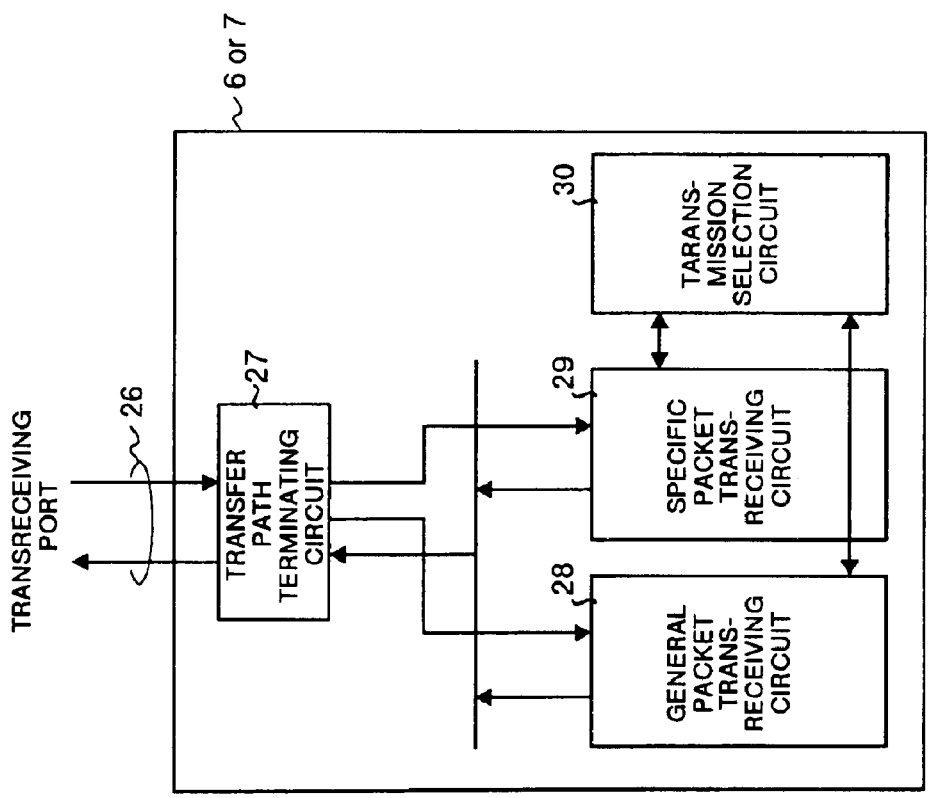
FIG. 4 shows a portion relating to packet transaction in internal configuration of a master device and a slave device according to Embodiment 2.

FIG. 4 shows portions relating to transaction of a packet in internal configuration of the master device 6 as well as of the slave device 7 according to the present invention. In this figure reference numeral 26 indicates a transreceiving port, reference numeral 27 indicates a transfer path terminating circuit. Reference numeral 28 indicates a general packet transreceiving circuit, reference numeral 29 indicates a specific packet transreceiving circuit, and reference numeral 30 indicates a transmission selection circuit.

Operations of the master device 6 and slave device 7 according to this embodiment are explained here. For instance, when a general packet or a specific packet has been received from the transreceiving port 26, at first the transfer path terminating circuit 27 in the master device 6 or in the slave device 7 checks the identification bit in the control area of the packet. When a result of checking indicates a general packet, then this general packet is inputted into the general packet transreceiving circuit 28. When a result of checking indicates a specific packet, then this specific packet is inputted into the specific packet transreceiving circuit 29.

On the other hand, when a general packet or a specific packet is to be transmitted, the general packet transreceiving circuit 28 or the specific packet transreceiving circuit 29 sends the packet from the transreceiving port 26 after getting a permission from the transmission selection circuit 30 in the master device 6 or in the slave device 7.

Operations of the transmission selection circuit 30 are explained here. For instance, when a transmission request has not been received from the specific packet transreceiving circuit 29, and if a transmission request is received from the general packet transreceiving circuit 28, then the transmission selection circuit 30 allows the transmission.

On the other hand, when a transmission request is received from the specific packet transreceiving circuit 29, then the transmission selection circuit 30 inhibits transmission of the specific packet for a specified period of time required for transmission of one packet after the request is received. During this specified period of time, if a general packet is being transmitted from the general packet transreceiving circuit 28, then the transmission is continued but transmission of a new packet is inhibited. Then after passage of the specified period of time, transmission from the specific packet transreceiving circuit 29 is preferentially executed prior to transmission from the general packet transreceiving circuit 28.

With the procedure as described above, in the present embodiment, a delay time in an operating sequence from a point of time when the specific packet transreceiving circuit 28 request transmission until a point of time when a header of a specific packet is outputted from the transreceiving port 26 is always equal to a sum of a specified period of time required for transmission of one packet and other constant processing delay time (such as a time required for passing through the transfer path terminating circuit or the like) regardless of how a general packet is being transmitted, so that fluctuation of delay time in the processing sequence does not occur. Also the delay time for this processing in the master device 6 is identical to that in the slave device 7, and fluctuation in the delay time does not occur in both of the devices. Accordingly, there occurs no fluctuation of a delay time due to queuing in transferring a specific packet between the specific packet transreceiving circuit 29 in the slave device 7 and the specific packet transreceiving circuit 29 in the master device 6.

Also as a delay time itself in the master device 6 or slave device 7 can be regarded as a portion of the transfer delay time Td computed through the equation (1) and equation (2), and fluctuation of a transfer delay time due to queuing is zero, so that the equation (3) is satisfied with extremely high precision.

As described above, in this embodiment, precision of sampling time in the master device and that in each slave device can further be improved. It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

Embodiment 3 is also explained with the help of FIG. 1. It should be noted that the description is not made for the same portions as those in Embodiments 1 and 2 for simplifying description herein. In this Embodiment 3, of the types of packets to be treated, a flow of operations for sampling time adjustment between the master device 6 and each of the slave devices 7, operations for transaction between the master device 6 and each of the slave devices 7, and operations of the packet multiplexer 8, an operation for relaying a packet from the slave device 7 to the master device 6 is the same as that explained in Embodiment 2. Herein, of the operations of the packet multiplexer 8 is different from that in Embodiments 1 and 2.

It is an object of the communication network according to this embodiment to match a delay time in transfer in both direction in the master device to that in the slave device with high precision.

Figure 5:
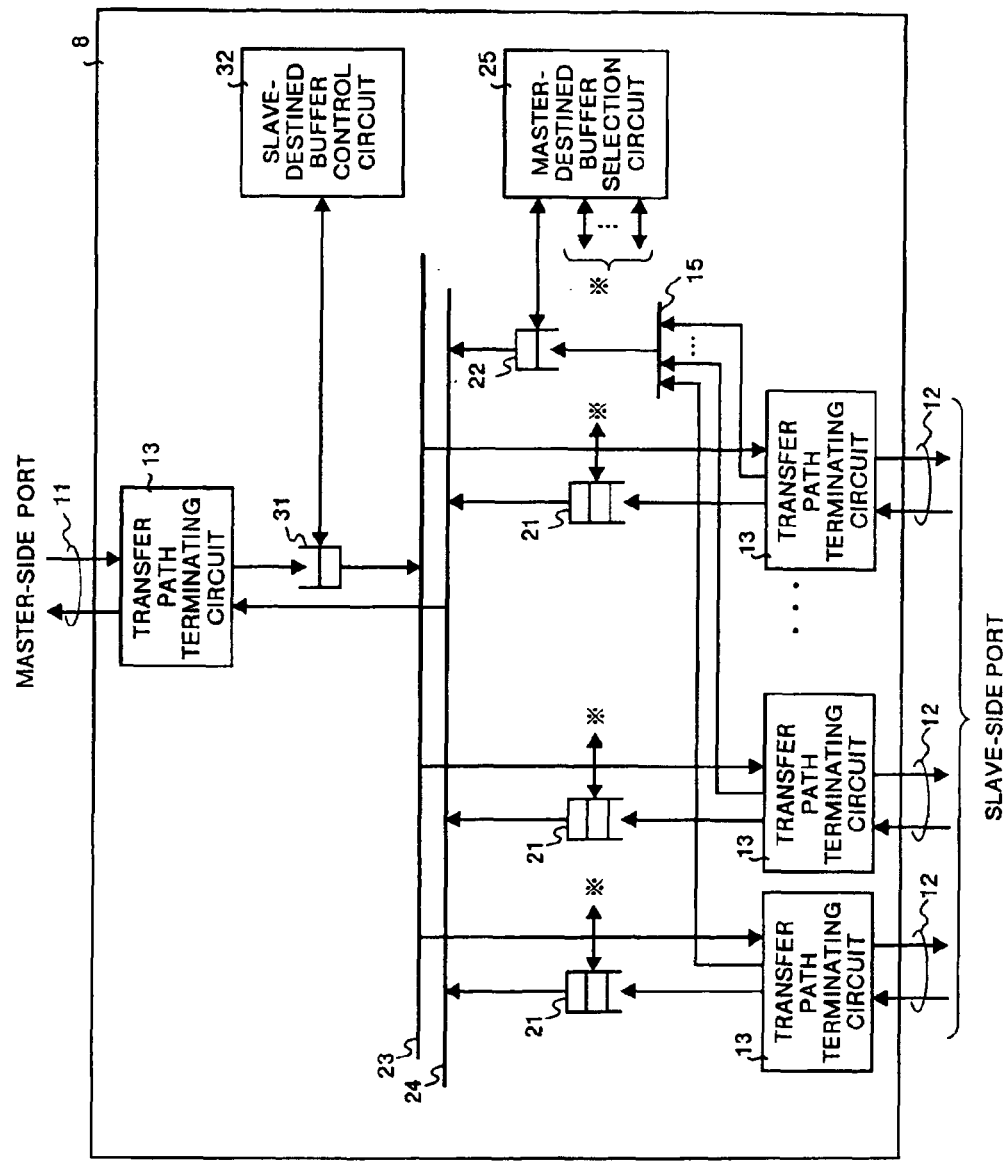
FIG. 5 shows an internal configuration of a packet multiplexer according to Embodiment 3.

FIG. 5 shows an internal configuration of the packet multiplexer 8 according to this embodiment. It should be noted that the same reference numerals are assigned to the same portions as those in the configuration described above and detailed description thereof is not made herein. In this figure, reference numeral 31 indicates a slave-destined packet buffer provided to the master-side port 11, and reference numeral 32 indicates a slave-destined buffer control circuit for controlling the slave-destined buffer.

To begin with, operations of the packet multiplexer 8 according to this embodiment when relaying a packet from the master device 6 to the slave device 7 are explained. For instance, when the packet multiplexer 8 receives a general packet or a specific packet from the master-side port 11, the packet is once stored in the slave-destined packet buffer 31 and broadcast via the packet broadcasting bus 23 to all of the slave-side ports 12. In this step, for a specified period of time from a point of time when a header of the packet is stored in the slave-destined packet buffer 31 until a point of time when an end of the packet is stored therein, namely for a specified period of time required for transmission of one packet, the packet is stored in the slave-destined buffer control circuit 32, and then outputted from the slave-destined packet buffer 31 after passage of the specified period of time. Namely, all of packets are delayed for the specified period of time using the slave-destined packet buffer 31.

With the procedure described above, in the present embodiment, a delay time in relay from a point of time when a header of the packet arrives in the master-side port 11 in the packet multiplexer 8 until a point of time when a header of the specific packet is outputted from the slave-side port 12 is always equal to a sum of a constant period of time required for transmission of one packet and other constant processing delay time (such as a time required for passing through the transfer path terminating circuit or the like). This value matches a delay time in relay of a specific packet by the packet multiplexer 8 from the slave-side port 12 to the master-side port 11 with high precision.

As described above, in the present embodiment, a delay time in transferring a specific packet in the slave device 7 is matched to that in the master device 6 with high precision regardless of a number of packet multiplexers through which the specific packet passes, and it is not required to previously set a difference of a delay time in transfer in both directions in a slave device, which simplifies management of each slave device.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

The configuration of communication network according to Embodiment 4 is also explained with to the help of FIG.

1. It should be noted that the description is not made for the same portions as those in Embodiments 1 to 3 for simplifying the description. In this Embodiment 4, of the types of packets to be treated, a flow of operations for sampling time adjustment between the master device 6 and each of the slave devices 7, operations for transaction between the master device 6 and each of the slave devices 7, and operations of the packet multiplexer 8, an operation for relaying a packet from the slave device 7 to the master device 6 is the same as that in Embodiment 2. Herein, of the operations of the packet multiplexer 8 is different from that in Embodiments 1 and 2.

It is an object of the communication network according to this embodiment to match a delay time in transfer in both direction in the master device to that in the slave device with high precision and also to reduce a delay time in transferring a specific packet from the master device to the slave device.

Figure 6:
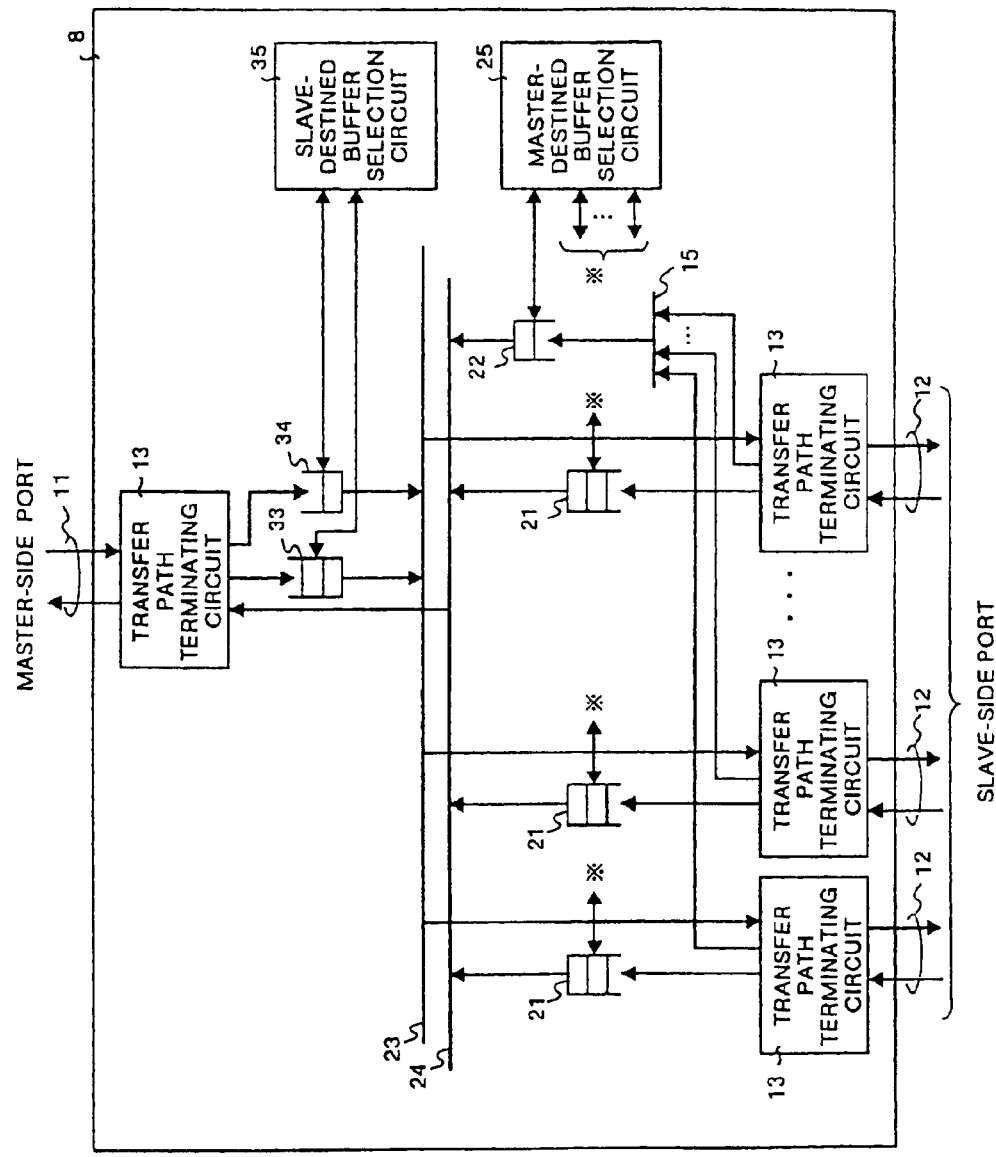
FIG. 6 shows an internal configuration of a packet multiplexer according to Embodiment 4.

FIG. 6 shows an internal configuration of the packet multiplexer 8 according to this embodiment. It should be noted that the same reference numerals are assigned to the same portions as those described above and detailed description thereof is omitted herein. In this figure, reference numeral 33 indicates a slave-destined general packet buffer provided to the master-side port 11, reference numeral 34 indicates a slave-destined specific packet buffer provided to the master-side port 11. Reference numeral 35 indicates a slave-destined buffer selection circuit for selecting each slave-destined buffer.

Operations of the packet multiplexer 8 according to Embodiment 4 of the present invention when relaying a packet from the master device 6 to the slave device 7 are explained here. For instance, when a general packet or a specific packet is received from the master-side port 11 the transfer path terminating circuit 13 in the packet multiplexer 8 checks the identification bit in the control area of the packet.

When a result of checking indicates a general packet, then this general packet is once stored in the slave-destined general packet buffer 33. When a result of checking indicates a specific packet, then this specific packet is once stored in the slave-destined specific packet buffer 34. Each of the buffer broadcasts the specific packet via the packet broadcasting bus 23 to all of the slave-side ports 12 after getting a permission from the slave-destined buffer selection circuit 35.

Operations of the slave-destined buffer selection circuit 35 are explained here. For instance, when a specific packet is not stored in the slave-destined specific packet buffer 34, and if a general packet is stored in the slave-destined general packet buffer 33, then the slave-destined buffer selection circuit 35 allows output thereof. It should be noted that, even if a packet as a whole has not been stored in the buffer, when a header of the packet is stored, it is regarded that the entire packet has been stored there.

On the other hand, when a header of a specific packet is stored in the slave-destined packet buffer 34, then the slave-destined buffer selection circuit 35 inhibits output of the specific packet until the entire packet has been stored in the slave-destined specific packet buffer 34, namely for a specific period of time required for transmission of one packet as a whole. During this specific period of time, if a general packet is being outputted from the slave-destined general packet buffer 33, then output thereof is continued but a new output is not allowed. After passage of the specified period of time, the slave-destined buffer selection circuit 35 allows output from the slave-destined specific packet buffer 34 prior to that form the slave-destined general packet buffer 33.

With the procedure described above, in this embodiment, a delay time in relay from a point of time when a header of a specific packet arrives in the master-side port 11 of the packet multiplexer 8 until a point of time when a header of the specific packet is outputted from the slave-destined port 12 is always equal to a sum of a certain constant period of time required for transmission of one packet and other constant processing delay time (such as a time required for passing through the transfer path terminating circuit or the like). This value matches a delay time when the packet multiplexer 8 relays a specific packet in the reverse direction in, namely from the slave-side port 12 to the master-side port 11, with high precision.

Accordingly, in this embodiment, a delay time in relaying a specific packet from the slave device 7 to the master device 6 matches that in relay thereof in the reverse direction with high precision, and it is not required to set a difference in delay times in relaying a specific packet in two directions, which makes management of each slave device simple.

Further, in this embodiment, if a packet is not stored in the slave-destined specific packet buffer 34 of the packet multiplexer nor in the slave-destined general packet buffer 33 therein, a delay time in relay from a point of time when a general packet arrives in the master-side port 11 of the packet multiplexer 8 until a point of time when the general packet is outputted from the slave-side port 12 is always equal to a constant time required for processing, and the delay time can further be reduced as compared to that in Embodiment 3.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

The configuration of a communication network according to the Embodiment 5 is explained with the help of FIG. 1. It should be noted that the same reference numerals are assigned to the same components as those in Embodiments 1 to 4 described above and description thereof is omitted herein. Further, a flow of operations for matching the sampling time between the master device 6 and each of the slave devices 7 are the same as those in Embodiments 1 to 4 excluding that a management packet is transacted between the master device 6 and each of the slave devices 7.

In this embodiment, a general packet and a specific packet are transacted between the master device 6 and slave device 7, and also a management packet as information for management of each device is transacted between the master device 6, the slave device 7, and the packet multiplexer 8. It is assumed herein that a management packet has the same fixed packet length as those of the general packet and the specific packet. Further, the management packet can accommodate fluctuation in a delay time like the general packet. However, the packet multiplexer 8 terminates the management packet internally without relaying it, so that it is necessary to differentiate the management packet form the general packet. Accordingly, a control area is provided at a head of each of the management packet, the general packet, and the specific packet, and an identification bit for each packet is provided at a head of the control area.

It is an object of the communication network according to the present invention to match a delay time in relaying specific packet in the master device to that in the slave device with high precision, even if a packet multiplexer sends or receives a management packet as defined hereinafter.

Figure 7:
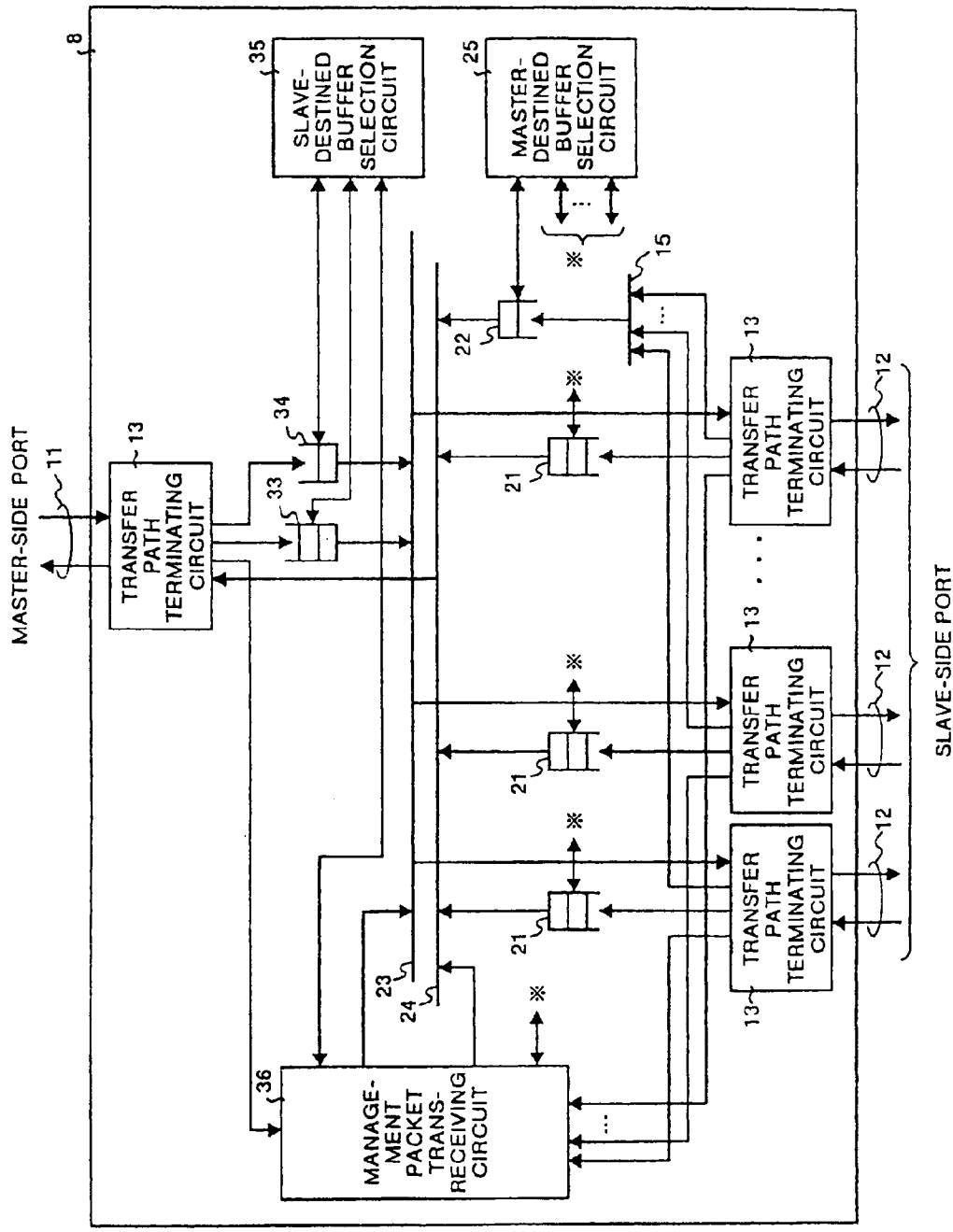
FIG. 7 shows an internal configuration of a packet multiplexer according to Embodiment 5.

FIG. 7 shows an internal configuration of the packet multiplexer 8 according to the present invention. It should be noted that the same reference numerals are assigned to the same components as those described above and detailed description thereof is omitted herein. In this figure, the reference numeral 36 indicates a management packet transreceiving circuit.

Operations of the packet multiplexer 8 are explained here. For instance, when any of a general packet, a specific packet, and a management packet is received from each of the slave-side ports 12, the transfer path terminating circuit 13 in the packet multiplexer 8 refers to the identification bit in the control area of the packet. When a result of checking indicates a general packet, then this general packet is once stored in the master-destined general packet buffer 21 provided to the slave-side port 12. When a result of checking indicates a specific packet, then this specific packet is once stored in the master-destined specific packet buffer 22. When a result of checking indicates a management packet, then this management packet is inputted as it is into the management packet transreceiving circuit 36.

When the master-destined general packet buffer 21, the master-destined specific packet buffer 22, and the management packet transreceiving circuit 36 send a packet to the master-side port 11 respectively, in the packet multiplexer 8, at first permission is obtained from the master-destined buffer circuit 25, and then the packet is transmitted from the master-side port via the packet multiplexing bus 24.

Operations of the master-destined buffer selection circuit 25 are the same as those of the buffer selection circuits described in any of Embodiments 1 to 4. Output from the master-destined specific packet buffer 22 is inhibited for a specified period of time required for transmission of one packet, and also new output from the master-destined general packet buffer 21 as well as from the management packet transreceiving circuit 36 is inhibited. Further, after passage of the specified period of time, output from the master-destined specific packet buffer 22 is allowed. When a general packet or a specific packet or a management packet is received, the case is the same as the one when a packet is received from the slave-side port 12.

When the slave-destined general packet buffer 33, the slave-destined specific packet buffer 34, and the management packet transreceiving circuit 36 send a packet to the slave-side port 12 respectively, a permission is obtained from the slave-destined buffer selection circuit 35 in the packet multiplexer 8 and then the packet is broadcast to all of the slave-side ports 12 via the packet broadcasting bus 23.

The operations of the slave-destined buffer selection circuit are the same as those in the buffer selection circuits described in any of Embodiments 1 to 4. Output from the slave-destined specific packet buffer 34 is inhibited for a specified period of time required for transmission of one packet as a whole, and a new output from the slave-destined general packet buffer 33 and the management packet transreceiving circuit 36 is inhibited. After passage of the specified period of time, output from the slave-destined specific packet buffer 34 is allowed.

With the operations as described above, in the present embodiments, a delay time in relay from a point of time when a header of a specific packet arrives at the slave-side port 12 of the packet multiplexer 8 until a point of time when a header of the specific packet is outputted from the master-side port 11 is always equal to a sum of a constant period of time required for transmission of one packet as a whole and other constant processing delay time (such as a time required for passing through the transfer path terminating circuit or the like) regardless of how a general packet is being relayed or a management packet is being transmitted, so that fluctuation of a delay time due to queuing never occurs. Accordingly, there occurs no fluctuation of a delay time in relaying a specific packet from the slave device 7 to the master device 6 due to queuing.

A delay time in the packet multiplexer 8 in relaying a specific packet in the reverse direction, fluctuation of a delay time in relay, and fluctuation of a delay time in transferring a specific packet from the master device 6 to the slave device 7 are the same as those in Embodiments 1 to 4 described above. Accordingly, in this embodiment, also when the packet multiplexer 8 sends or receives a management packet, a delay time in transferring a specific packet in the slave device can be matched to that in the master device with high precision, and precision of sampling time in the master device and slave device can be improved.

It was assumed above that the general packet, the specific packet and the management packet have a fixed packet length. However, even when the general packet, the specific packet have a variable length, by setting a specified period of time for inhibiting transmission of the specific packet to a time decided by a time required for transmission of one packet with the previously specified maximum length under control of a transmission selection, the same effect as that described above can be obtained.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

Figure 8:
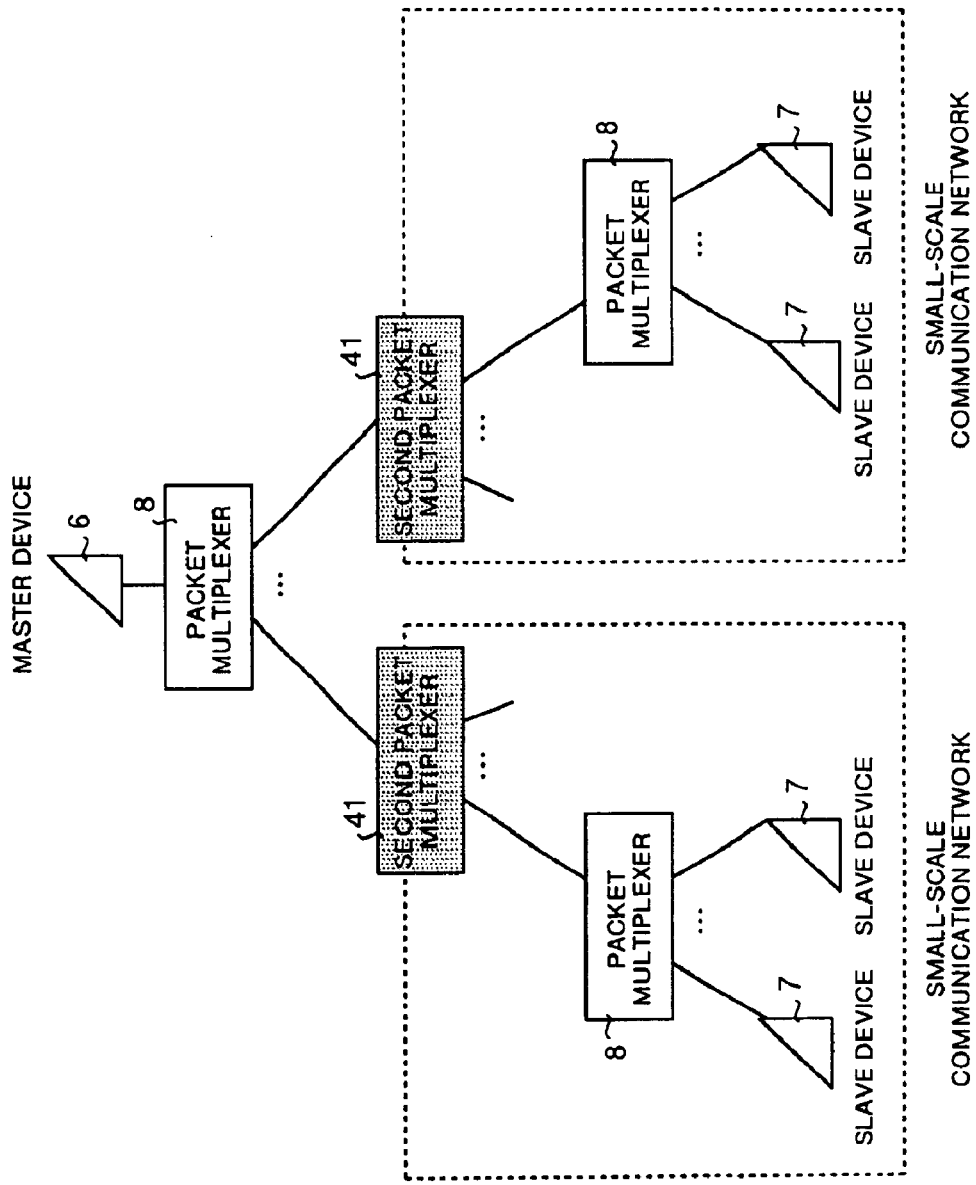
FIG. 8 shows a configuration of a communication network according to Embodiment 6.

FIG. 8 shows a configuration of a communication network according to Embodiment 6 of the present invention. It should be noted that the same reference numerals are assigned to the same components as those in Embodiments 1 to 5 and detailed description thereof is omitted herein. In this figure, reference numeral 41 indicates a second packet multiplexer. As shown in FIG. 8, in the communication network according to this embodiment, one or more units of packet multiplexers are provided according to the necessity with the second packet multiplexer 41 provided at the vertex to form a small-scale communication network in which a plurality of slave devices 7 are connected to each other in a tree-like form. Further, a plurality of second packet multiplexers 41 in the small-scale communication network are connected via one or a plurality of packet multiplexers 41 according to the necessity with the master device 6 provided at the vertex.

In Embodiment 6 of the present invention, type of packet to be treated, a flow of operations for sampling time matching in the master device 6 and in each of the slave devices 7, operations for transreceiving in the master device 6 as well as in each of the slave devices 7, and operations of the packet multiplexer 8 are the same as those described in any of Embodiments 1 to 5.

It is an object of the communication network according to this embodiment to improve precision of sampling time in each slave device even when a large number of slave devices are provided.

Functions of the second packet multiplexer 41 are explained here. In the communication network according to Embodiments 1 to 5 described above, the master device 6 polls each of the slave devices 7 according to a round-robin, and sampling time matching is executed between the master device 6 and the polled slave device 7 like that in the communication network based on the conventional technology.

Each of the slave devices 7 regenerates the sampling time according to the local operation clock until polling is executed from the master device 6 next time. When the slave device is polled next time, the slave device computes a deviation ΔT of sampling time generated due to a difference in a frequency clock between the master device 6 and the slave device 7 and corrects the local sampling time therein. The time interval at which a slave device 7 is polled by the master device 6 is proportional to a number of all slave devices in this communication network. Accordingly, when a number of slave devices 7 increases, precision of sampling time in each slave devices 7 degrades.

In order to solve this problem, the second packet multiplexer 41 is provided in the communication network according to the present invention. This second packet multiplexer 41 has a function of sending or receiving a packet without relaying the specific packet. Further, the second packet multiplexer 41 functions as a slave device 7 for sampling time matching to the upper level master device 6, and functions as a master device 6 for sampling time matching to the lower level slave device 7. In other words, structure for sampling time matching is divided into two layers with the second packet multiplexer 41 in between.

Thus, assuming that a time required for the master device 6 to complete the sampling time matching by polling one slave device 7 is Tp, and if 100 units of slave devices 7 are provided, then the polling time interval for one slave device will be Tp×100.

On the other hand, when 10 units of second packet multiplexers 41 are provided and if each of the second packet multiplexer 41 accommodates 10 units of slave device 7 therein, then the time interval at which the master device 6 polls one second packet multiplexer 41 is Tp×10. Further, a time interval at which the second packet multiplexer 41 polls any of the lower level 10 units of slave device is also Tp×10.

As described above, a time interval at which the master device 6 polls one slave device 7 may be regarded substantially as Tp×20, and precision of sampling time in each slave device is improved by about five times as compared to that when the second packet multiplexer 41 is not provided.

Figure 9:
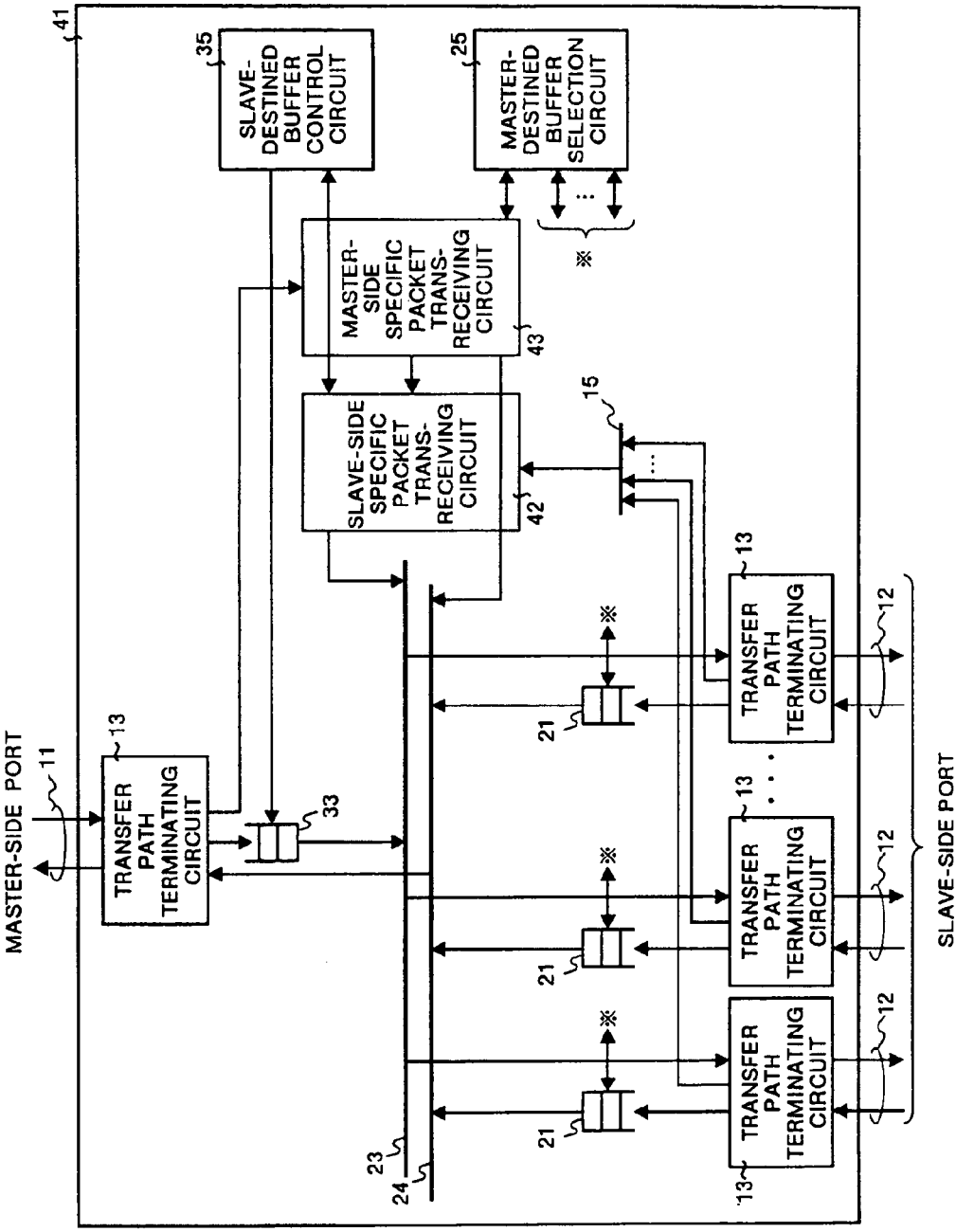
FIG. 9 shows an internal configuration of a second packet multiplexer according to Embodiment 6.

FIG. 9 shows an internal configuration of the second packet multiplexer 41 according to this embodiment. It should be noted that the same reference numerals are assigned to the same components as those described above and detailed description thereof is omitted herein.

In FIG. 9, reference numeral 42 indicates a slave-side specific packet transreceiving circuit having a function as the master device 6 for sampling time matching, and reference numeral 43 indicates a master-side specific packet transreceiving circuit for always reporting sampling time to the slave-side specific packet circuit 42.

Operations of the second packet multiplexer 41 according to the present embodiment are explained here. For instance, when a general packet or a specific packet is received from each slave-side port 12, the transfer path terminating circuit 13 in the second packet multiplexer 41 checks the identification bit in the control area of the packet. When a result of the checking indicates a general packet, then this general packet is once stored in the master-destined general packet buffer 21 provided to the slave-side port 12. When a result of the checking indicates a specific packet, then this specific packet is inputted into the slave-side specific packet transreceiving circuit 42.

When the master-destined general packet buffer 21 or the master-side specific packet transreceiving circuit 43 sends a packet to the master-side port 11, then the packet is transmitted via the packet multiplexer bus 24 from the master-side port 11 after getting a permission from the master-destined buffer selection circuit 25 in the second packet multiplexer 41.

The operations of the master-destined buffer selection circuit 25 are the same as those of the buffer selection circuit explained in any of Embodiments 1 to 5. Output from the master-side specific packet transreceiving circuit 43 is inhibited for a constant specified period of time, and a new input from the master-destined general packet buffer 21 is inhibited. After passage of the specified period of time, output from the master-side specific packet transreceiving circuit 43 is allowed. When a general packet or a specific packet is received from the master-side port 11, the same operations as those when a packet is received from the slave-side port 12 are executed.

When the slave-destined general packet buffer 33 or slave-side specific packet transreceiving circuit 42 send a packet to the slave-side port 12, the packet is broadcast via the packet broadcasting bus 23 to all of the slave-side ports 12 after getting a permission from the slave-destined buffer selection circuit 35 in the second packet multiplexer 41.

The operations of the slave-destined buffer selection circuit 35 are also the same as those of the buffer selection circuits explained in any of Embodiments 1 to 6. Output from the slave-side specific packet transreceiving circuit 42 is inhibited for a specified period of time required for transmission of one packet, and a new output is inhibited from the slave-destined general packet buffer 33. Output from the slave-side specific packet transreceiving circuit 42 is allowed after passage of the specified period of time.

With the procedure as described above, in this embodiment, a delay time in an operating sequence from a point of time when the master-side specific packet transreceiving circuit 43 or slave-side specific packet transreceiving circuit 42 requests transmission until a point of time when a header of a specific packet is outputted from the master-side port 11 or slave-side port 12 is always equal to a sum of a constant period of time and other constant processing delay time (such as a time required for passing through the transfer path terminating circuit or the like) regardless of how a general packet is being relayed, so that fluctuation in a delay time due to queuing does not occur. Further, there occurs no fluctuation in a delay time in transferring a packet between the master device 6 and the second packet multiplexer 41, nor between the second packet multiplexer 41 and each of the slave devices 7 due to queuing.

Accordingly, in this embodiment, a delay time in transferring a specific packet in the master device 6 can be matched to that in the second packet multiplexer 41 with high precision. Further, a delay time in transfer in the second packet multiplexer 41 can be matched to that in the slave device 7 with precision of sampling time in each slave device improved even when the number of slave devices is large.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

Figure 10:
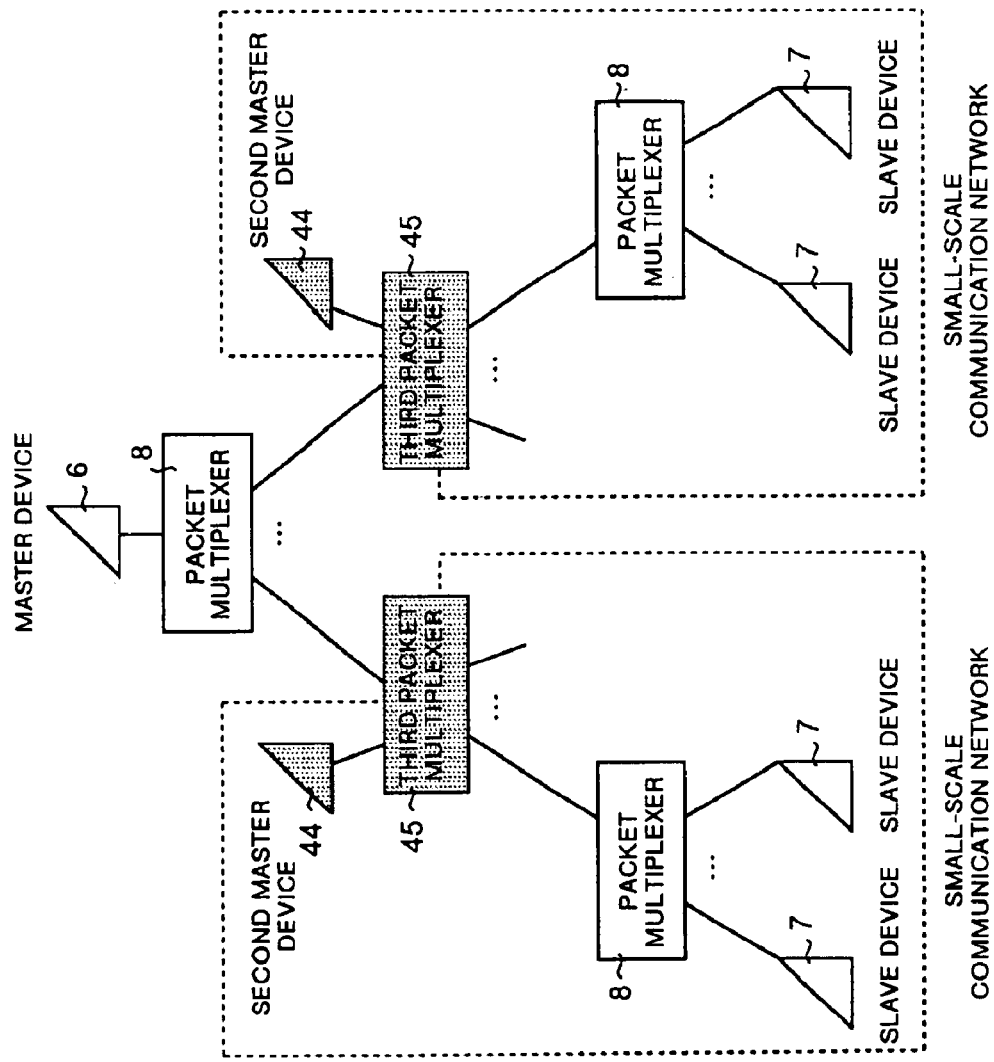
FIG. 10 shows a configuration of a communication network according to Embodiment 7.

FIG. 10 shows a configuration of a communication network according to Embodiment 7. It should be noted that the same reference numerals are assigned to the same components as those described in Embodiment 1 to 6 and detailed description thereof is omitted herein. In this figure, reference numeral 44 indicates a second master device for transacting only a general packet, and reference numeral 45 indicates a third packet multiplexer for connecting one unit of second master device 44 thereto.

As shown in FIG. 10, in the communication network according to this embodiment, at first a small-scale communication network is constructed in which a plurality of slave devices 7 are connected to each other in a tree form via one unit of third packet multiplexer 45 and one or more, any according to the necessity, of packet multiplexers 8 with the second master device 44 provided at the vertex. Further, a plurality of third packet multiplexers 45 in the small-scale communication network are connected to one or more, again according to the necessity, of packet multiplexers 8.

The second master device 44 collects a general packet, namely sampling information from all of the lower level slave devices 7. The master device 6 selects and thereby collects some of the sampling information transmitted from the slave devices 7 in the small-scale communication network. Also the master device 6 executes time matching for all of the slave devices 7. The second master device 44 does not execute time matching. Thus, sampling time in all of the slave devices 7 in the communication network is matched.

In this embodiment, types of packet to be treated, a flow of operations for time matching between the master device 6 and each slave device 7, operations for transaction between the master device 6 and each of the slave devices 7, and operations of the packet multiplexer 8 are the same as those in Embodiments 1 to 6.

The communication network configuration as shown in FIG. 10 is applied to a case where, for instance, most of sampling information in slave devices in a small-scale communication network is effective only in the lower level second master device 44 but some of the information is effective in the master device that controls the entire communication network and exist in each small-scale communication network.

The third packet multiplexer 45 has a function of checking the sampling information transmitted from one slave device 7, namely information for destination stored in the control area of the general packet, then determining whether the information is transferred to the master device 6 or to the second master device 44, or to both of the master devices 6 and 44, and relaying the information to the corresponding port.

It is an object of the communication network according to this embodiment is to match a transfer delay time in a master device for time matching and that in each slave device with high precision even when there are a plurality of master devices each for collecting the sampling information from the slave devices.

Figure 11:
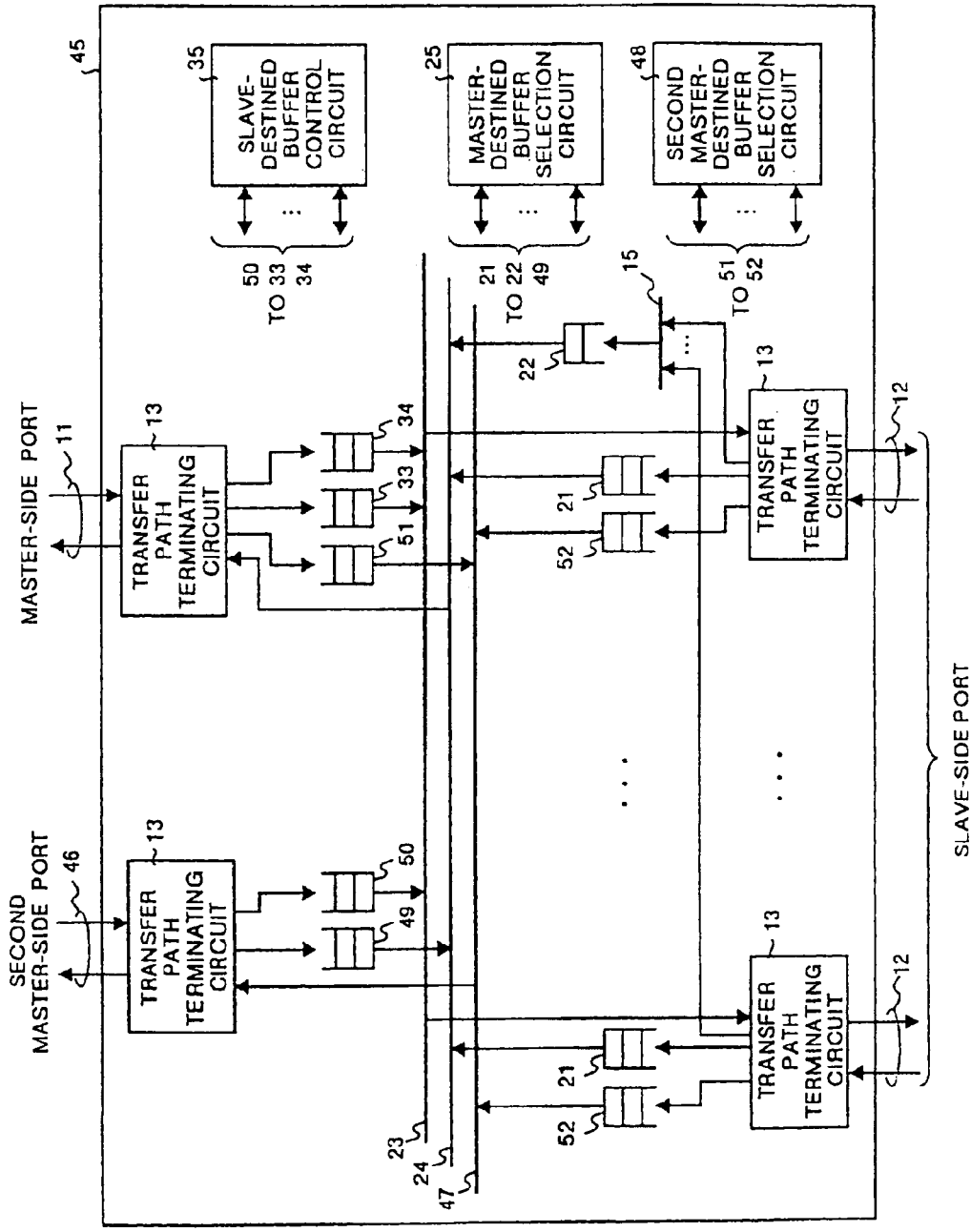
FIG. 11 shows an internal configuration of a third packet multiplexer according to Embodiment 7.

FIG. 11 shows an internal configuration of the third packet multiplexer 45 according to this embodiment. It should be noted that the same reference numerals are assigned to the same components as those described above and detailed description thereof is omitted herein. In this figure, reference numeral 46 indicates a second master-side port, reference numeral 47 indicates a master-destined packet multiplexing bus used for relay to the second master-side port 46. Reference numeral 48 indicates a second master-destined packet buffer selection circuit, reference numeral 49 indicates a second master-side master-destined general packet buffer provided to the second master-side port 46, reference numeral 50 indicates a second master-side slave-destined general packet buffer provided to the second master-side port 46. Reference numeral 51 indicates a master-side second master-destined general packet buffer provided to the master-side port 11, and reference numeral 52 indicates a slave-side second master-destined general packet buffer provided to each slave-side port 12.

Operations of the third packet multiplexer 45 according to this embodiment are explained here. For instance, when a general packet or a specific packet is received from each of the slave-side port 12, the transfer path terminating circuit 13 in the third packet multiplexer 45 checks the identification bit in the control area of the packet and information on destination.

When a result of the checking indicates a master-destined general packet, then this general packet is once stored in the master-destined general packet buffer 21 provided to the slave-side port 12. When a result of the checking indicates a general packet destined to the second master device, then this general packet is once stored in the slave-side second general packet buffer 52 provided to the slave-side port 12. When a result of the checking indicates a specific packet, then this specific packet is once stored in the master-destined specific packet buffer 22 provided for all of the slave-side ports 12. When a general packet or a specific packet is received from the master-side port 11 or the second master-side port 46, the packet is once stored in the buffers provided to each receiving port as described above.

When a packet is transmitted from the master-side port, each of the master-destined general packet buffer 21, the master-destined specific packet buffer 22, and the second master-side master-destined general packet buffer 49 gets permission from the master-destined packet buffer selection circuit 25, and then transmits the packet via the packet multiplexing bus 24 to the master-side port 11. It should be noted that operations of the master-destined packet buffer selection circuit 25 are the same as those of the buffer selection circuits described in any of Embodiments 1 to 6.

Output from the master-destined specific packet buffer 22 is inhibited for a specified period of time required for transmission of one packet and a new output from other buffers is inhibited. After passage of the specified period of time, output from the master-destined specific packet buffer 22 is allowed.

When broadcasting a packet from all of the slave-side ports 12, the slave-destined general packet buffer 33, the slave-destined specific packet buffer 34, and the second master-side slave-destined general packet buffer 50 get permission from the slave-destined packet buffer selection circuit 35, and then broadcast the packet via the packet broadcasting bus 23 to all of the slave-side port 12. Operations of the slave-destined packet selection circuit 35 are the same as those of the buffer selection circuit described in any of Embodiment 1 to 6. Output from the slave-destined specific packet buffer 34 is inhibited for a specified period of time required for transmission of one packet, new output from other buffer is inhibited, and after passage of the specified period of time, output from the slave-destined specific packet buffer 34 is allowed.

When transmitting a packet from the second master-side port 46, the master-side second master-destined general packet buffer 51 and slave-side second master-destined general packet buffer 52 get permission from the second master-destined packet buffer selection circuit 48 respectively, and then transmit the packet via the second master-destined packet multiplexing bus 47 from the second master-side port 46. The second master-destined packet buffer selection circuit 48 selects one of the buffers each with a general packet stored therein according to a round-robin and allows output therefrom.

With the procedure as described above, in this embodiment, a relay time required for the third packet multiplexer 45 to relay a specific packet between the master-side port 11 and slave-side port 12 is always equal to a sum of a specified period of time required for transmission of one packet and other constant processing delay time (such as a time for passing the transfer path terminating circuit or the like) regardless of how a general packet is being relayed, so that fluctuation in a delay time due to queuing does not occur. In addition, a delay time in transferring a specific packet in the master device 6 and that in the slave device 7 can be matched to each other with high precision. Accordingly, in this embodiment, even when a plurality of second master devices 44 each for collecting sampling information from the slave devices 7 are provided, precision of sampling time in the master device 6 and that in each slave device 7 can be improved.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

No comment is made for a management packet in the above description. However, by providing a management packet transreceiving circuit similar to that in Embodiment 5 in the third packet multiplexer, the same effects as those described above can be achieved in addition to the effects achieved in Embodiment 5.

Further, a specific packet transreceiving circuit is not provided in the third packet multiplexer, the same effects as those described above can be achieved in addition to the effects achieved in Embodiment 6 by providing a master-side specific packet transreceiving circuit and a slave-side specific packet transreceiving circuit similar to those in Embodiment 6.

Figure 12:
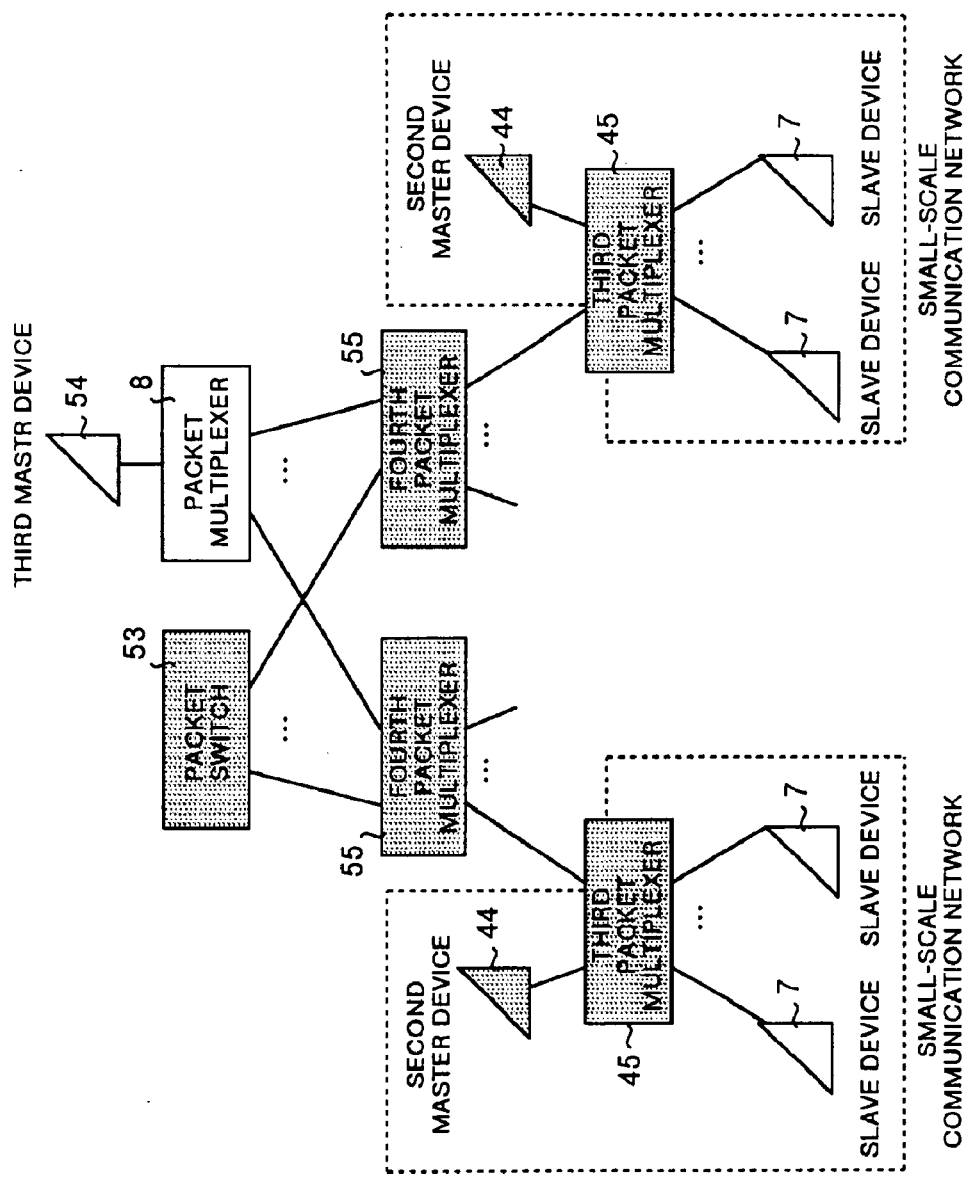
FIG. 12 shows a configuration of a communication network according to Embodiment 8.

FIG. 12 shows a configuration of the communication network according to Embodiment 8 of the present invention. It should be noted that the same reference numerals are assigned to components as those in Embodiments 1, 2, 3, 4, 5, 6 and 7 and description thereof is not made herein. In this figure, reference numeral 53 indicates a packet switch for exchanging only the general packets, reference numeral 54 indicates a third master device for transreceiving only the specific packets, and reference numeral 55 indicates a fourth packet multiplexer connected to the packet switch.

As shown in FIG. 12, in the communication network according to this embodiment, at first a small-scale network is constructed in which a plurality of slave devices 7 are connected to each other in a tree-form via one unit of third packet multiplexer 45 and one or more, according to the necessity, of packet multiplexers 8 with the second master device 44 at the vertex. Further, a plurality of third packet multiplexers 45 in the small-scale communication network are connected to each other via one or more fourth packet multiplexers 55 as well as via one or more, again according to the necessity, of packet multiplexers 8 with the third master device 54 provided at the vertex. At the same time, a plurality of fourth packet multiplexers 55 are connected via one or more, according to the necessity, of packet multiplexers 8 to each other with the packet switch 53 provided at the vertex.

The second master device 44 collects a general packet, namely sampling information from all of the slave devices 7 in the local small-scale communication network. Further, the second master device 44 selectively collects sampling information from some of the slave devices 7 outside the local small-scale communication network. The packet switch 53 and third packet multiplexer 45 check information on destination recorded in the control area of the packet and relays the packets through a port corresponding to the destination. The third master device 54 executes time matching for all of the slave devices 7. The second master device 44 does not execute time matching. Thus, sampling time in all of the slave devices 7 in the communication network can be matched.

In Embodiment 8, types of packet to be treated, a flow of operations for sampling time matching between the third master device 54 and each of the slave devices 7, operations for data transaction between the third master device 54, second master device 44, and each slave devices 7, and operations of the packet multiplexer 8 and third packet multiplexer 45 are the same as those in Embodiment 7.

In the communication network as shown in FIG. 12, for instance, most of sampling information in a slave device in a small-scale communication network is effective only in the upper level second master device 44, and only some of the information is applied when the information is effective in the second master device 44 in the small-scale communication network.

In order to realize the configuration as described above, the fourth packet multiplexer 55 has a function of classifying the packets received from the slave device 7 to general packets or specific packets, relaying the general packet to the packet switch 53 and the specific packet to the third master device 54 or in the reverse directions.

In the communication network according to this embodiment, a plurality of small-scale communication networks each comprising a master device and a plurality of slave devices are provided, and even when each master device collects sampling information from a slave device in the local small-scale network as well as from a slave device outside the local small-scale network, a delay time in transferring a specific packet in the master device for time matching and that in each slave device can be matched to each other with high precision.

Figure 13:
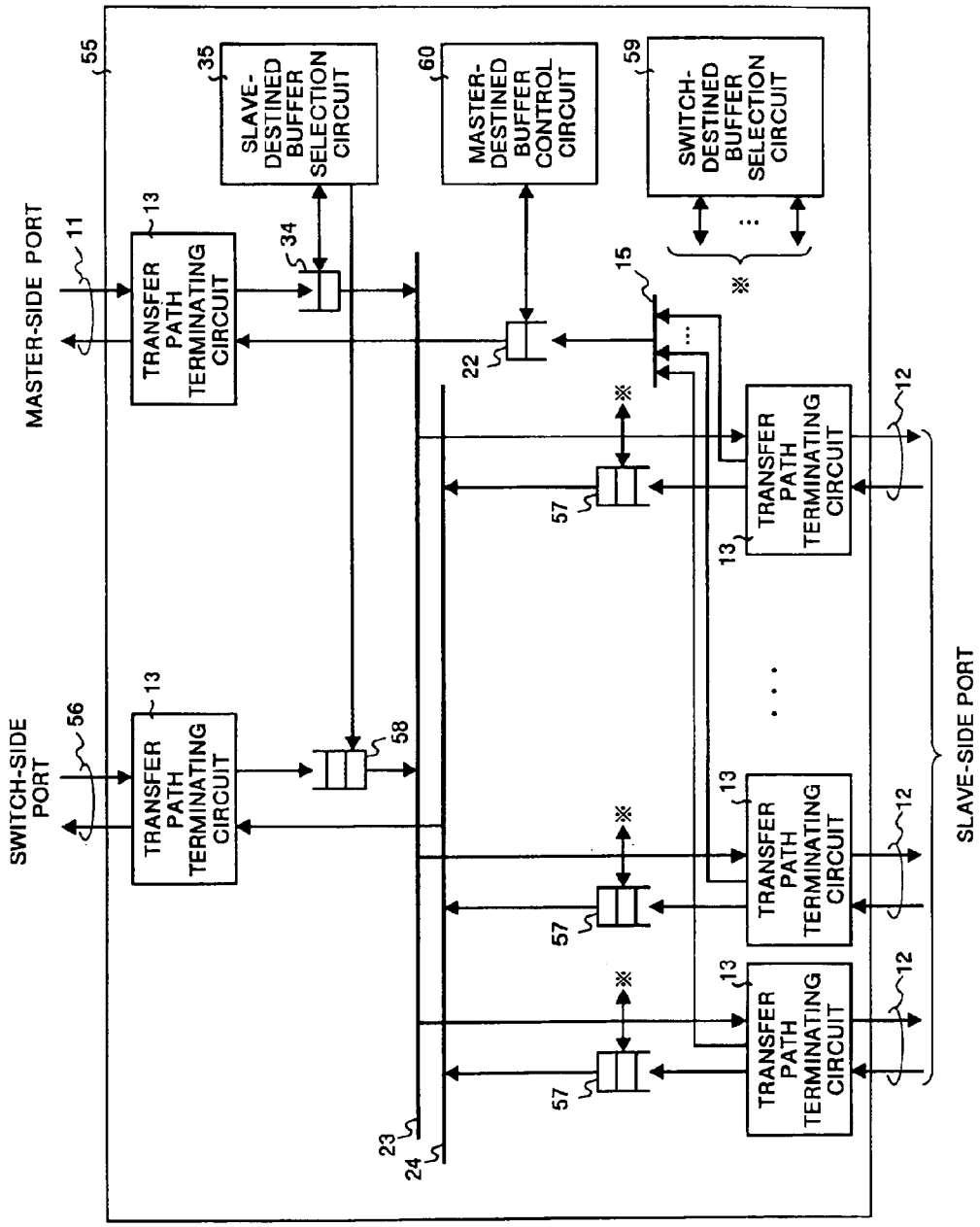
FIG. 13 shows an internal configuration of a fourth packet multiplexer according to Embodiment 8.

FIG. 13 shows an internal configuration of the fourth packet multiplexer 55 according to this embodiment. It should be noted that the same reference numerals are assigned to the same components as those described above and detailed description thereof is omitted herein. In this figure, reference numeral 56 indicates a switch-side port, reference numeral 57 indicates a switch-destined general packet buffer provided to each slave-side port 12, reference numeral 58 indicates a slave-destined general packet buffer provided to the switch-side port 56. Reference numeral 59 indicates a switch-destined buffer selection circuit, and reference numeral 60 indicates a master-destined buffer control circuit.

Operations of the fourth packet multiplexer 55 according to this embodiment are explained here. Operations of the transfer path terminating circuit 13 and each buffer, for instance, when a general packet or a specific packet is received from each port are the same as those in Embodiment 7.

When transmitting a packet from the master-side port 11, the master-destined specific packet buffer 22 gets permission from the master-destined packet buffer control circuit 60 and transmits the packet from the master-side port 11. The master-destined packet buffer control circuit 60 inhibits output from the master-destined specific packet buffer 22 for a specified period of time required for transmission of one packet, and allows output therefrom after passage of the specified period of time.

When broadcasting a packet from all of the slave-side ports 12, the slave-destined specific packet buffer 34 and slave-destined general packet buffer 58 get permission from the slave-destined packet buffer selection circuit 35, and then broadcast the packet through the packet broadcasting bus 23 to all of the slave-side ports 12. The slave-destined buffer selection circuit 35 inhibits output from the slave-destined specific packet buffer 34 for a specified period of time required for transmission of one packet and also inhibits new output from the slave-destined general packet buffer 58, and then allows output from the slave-destined specific packet buffer 34 after passage of the specified period of time.

When transmitting a packet from the switch-side port 56, each switch-destined general packet buffer 57 gets permission from the switch-destined packet buffer selection circuit 59, and then transmits the packet from the switch-side port 56 via the packet multiplexer 24. It should be noted that the switch-destined packet buffer selection circuit 59 selects one of the switch-destined general packet buffer 57 with general packets stored therein according to a round-robin and allows output therefrom.

With the procedure described above, a time required for the fourth packet multiplexer 55 to relay a specific packet between the master-side port 11 and slave-side port 12 is always equal to a sum of a specified constant period of time required for transmission of one packet and other constant processing delay time (such as a time required for passing through the transfer path terminating circuit or the like) regardless of how a general packet is being relayed, so that fluctuation in a delay time due to queuing does not occur. Further, a delay time in transferring a specific packet in the third master device 54 and that in the slave device 7 can be matched to each other with high precision.

Accordingly, in this embodiment, even when there are provided a plurality of small-scale communication network each comprising the second master device 44 and a plurality of slave devices 7 and each of the second master devices 44 collects sampling information from the slave devices in the local small scale network as well as from those outside the small-scale network, precision of sampling time in the third master device 54 and that in each of the slave devices 7 can be improved.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

No comment is made for a management packet in the above description. However, by providing a management packet transreceiving circuit similar to that in Embodiment 5 in the fourth packet multiplexer, the same effects as those described above can be achieved in addition to the effects achieved in Embodiment 5.

Further, a specific packet transreceiving circuit is not provided in the fourth packet multiplexer, the same effects as those described above can be achieved in addition to the effects achieved in Embodiment 6 by providing a master-side specific packet transreceiving circuit and a slave-side specific packet transreceiving circuit similar to those in Embodiment 6.

Further, a second master-side port is not provided in the fourth packet multiplexer, the same effects as those described above can be achieved in addition to the effects achieved in Embodiment 7 by providing a second master-destined receiving buffer selection circuit or the like similar to the one in Embodiment 7.

Figure 14:
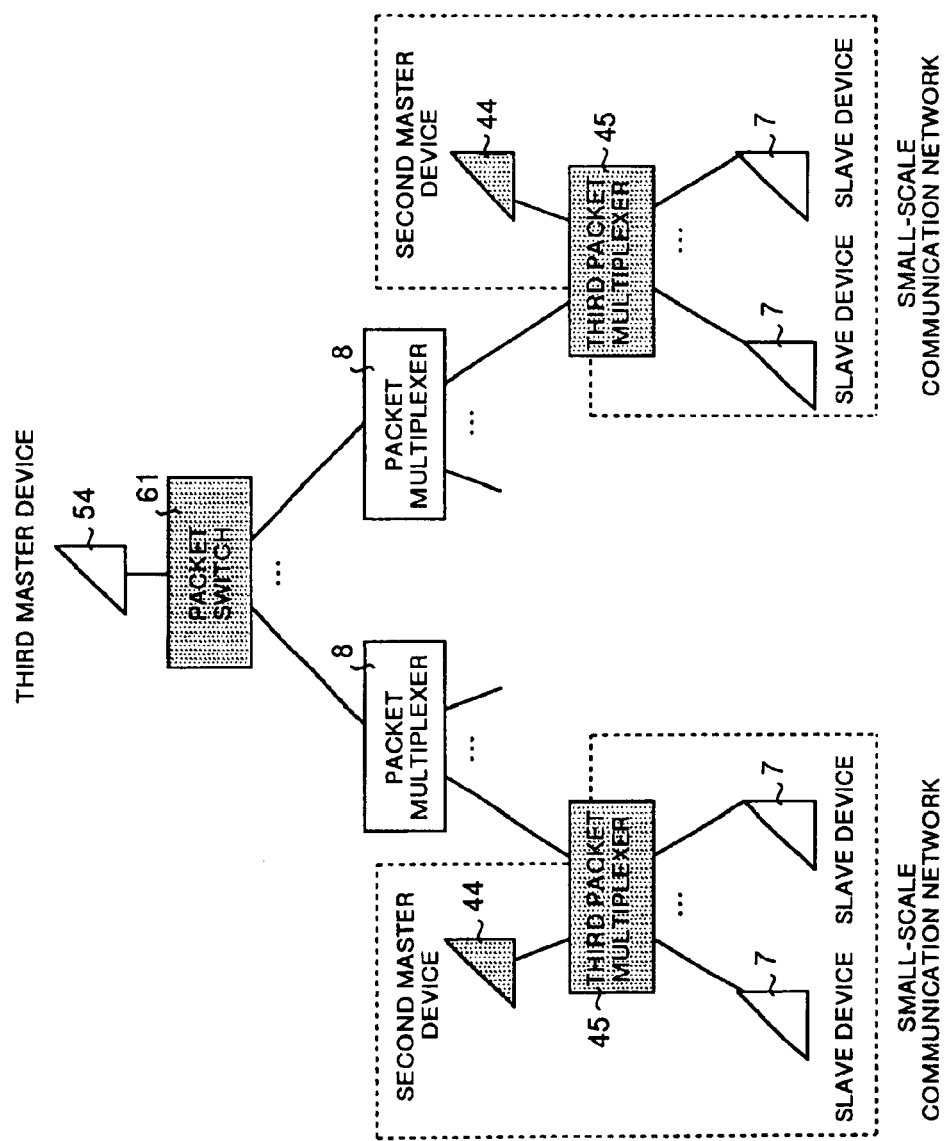
FIG. 14 shows a configuration of a communication network according to Embodiment 9.

FIG. 14 shows a configuration of the communication network according to Embodiment 9 of the present invention. It should be noted that the same reference numerals are assigned to the same components as those described above and detailed description thereof is omitted herein. As shown in this figure, in the communication network according to this embodiment, the packet switch 53 according to Embodiment 8 shown in FIG. 12 and packet multiplexer 8 connected to the third master device 54 are combined into a packet switch 61.

Types of packets to be treated and operations of the devices other than the packet switch 53 are the same as those in Embodiment 8. The packet switch 61 according to the present invention has functions of the packet switch 53 and the packet multiplexer 8 connected to the third master device 54 in Embodiment 8 as shown in FIG. 12.

In the communication network according to this embodiment, like in Embodiment 8, a plurality of small-scale communication networks each comprising a master device and a plurality of slave devices are provided, and even when each master device collects sampling information from a slave device in the local small-scale network as well as from a slave device outside the local small-scale network, a delay time in transferring a specific packet in the master device for time setting and that in each slave device are matched to each other with high precision.

Figure 15:
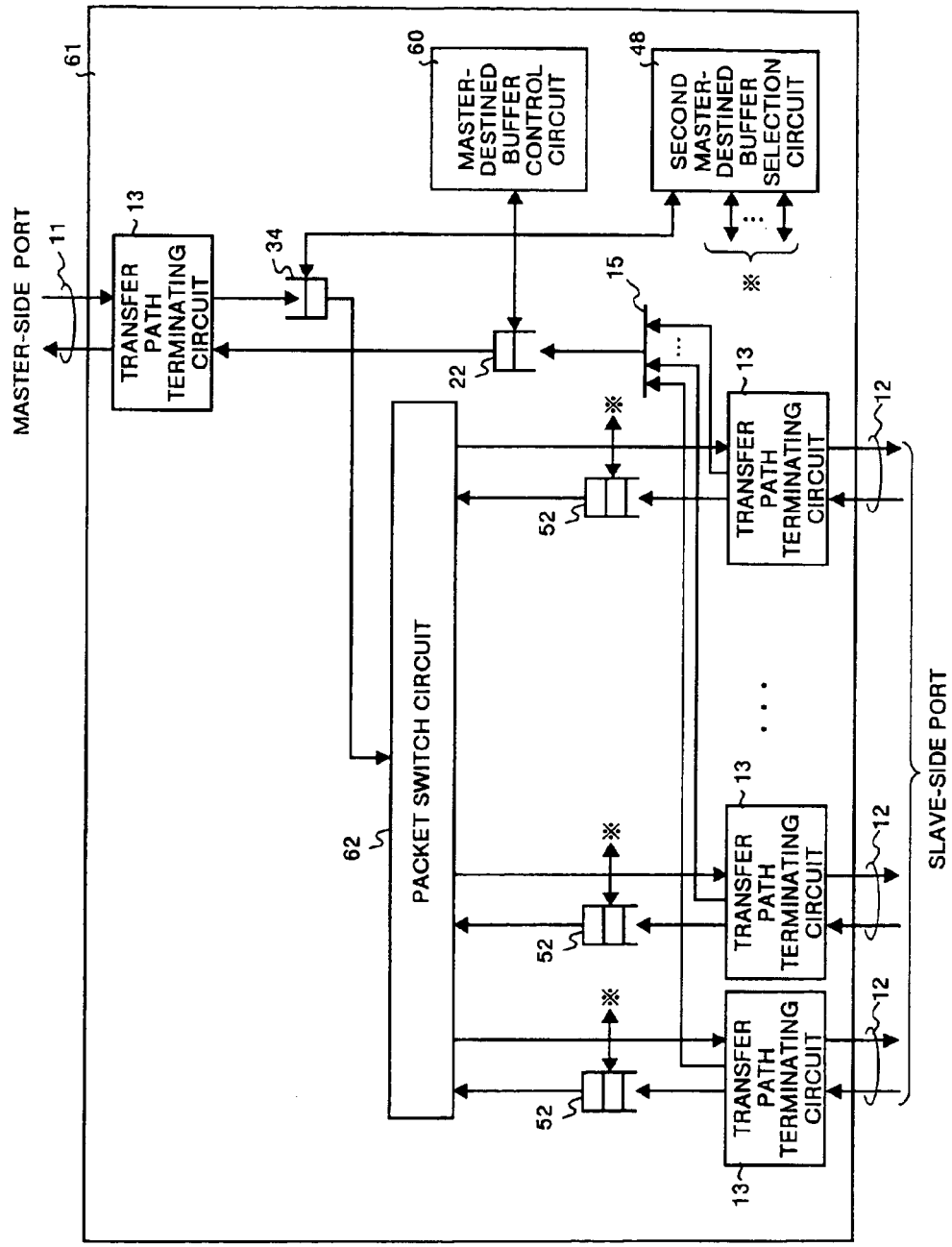
FIG. 15 shows an internal configuration of a packet switch according to Embodiment 9.
Figure 16:
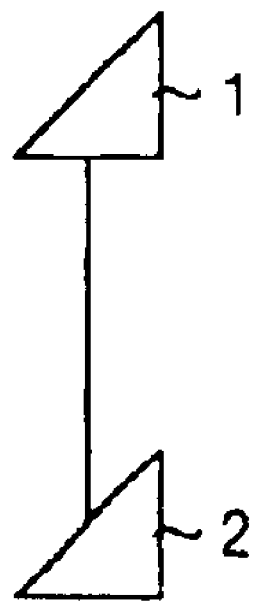
FIG. 16 shows a general configuration of a communication network based on the conventional technology.

FIG. 15 shows an internal configuration of the packet switch 61 according to this embodiment. It should be noted that the same reference numerals are assigned to the same components as those described above and detailed description thereof is omitted herein. In this figure, the reference numeral 62 indicates a packet switch circuit.

Operations of the packet switch 61 according to this embodiment are explained here. Operations of the transfer path terminating circuit 13 and each buffer, for instance, when a general packet or a specific packet is received from each port are the same as those in Embodiment 8. Further, the operations are the same as those of the fourth packet multiplexer 55 in Embodiment 8 when transmitting a packet from the master-side port 11.

When a packet is transmitted from each slave-side port 12, the second master-destined general packet buffer 52 and slave-destined specific packet buffer 34 get permission from the second-destined packet buffer selection circuit 48, and transmits, when a packet to be transmitted is a general packet, the packet from the slave-side port 12 corresponding to the destination via the packet switch circuit 62, and broadcast, when the packet to be transmitted is a specific packet, the packet from all of the slave-side ports 12.

The packet switch circuit 62 checks information on destination recorded in the control area at the header of each second master-destined general packet buffer 52 and relays the packet to the slave-side port 12 corresponding to the destination, and also checks the identification information recorded in a control area of the specific packet in the slave-destined special packet buffer 34, and relays the specific packet to all of the slave-side ports 12.

The second master-destined packet buffer selection circuit 48 inhibits output from the slave-destined specific packet buffer 34 for a specified period of time required for transmission of one packet and also inhibits new output from the second master-destined general packet buffer 52, and allows output from the slave-destined packet buffer 34 after passage of the specified period of time.

With the procedure described above, a delay time when the packet switch 53 relays a specific packet between the master-side port 11 and slave-side port 12 is always equal to a sum of a specific constant period of time required for transmission of one packet and other constant processing delay time (such as a time required for passing through the transfer path terminating circuit or the like) regardless of how a general packet is being relayed, so that fluctuation in a delay time due to queuing does not occur. Further, a delay time in transferring a specific packet in the third master device 54 and that in the slave device 7 are matched to each other with high precision.

Accordingly, in this embodiment, like in Embodiment 8, even when each second master device 44 collects sampling information from the slave devices 7 outside the local small-scale network as well as from the slave devices 7 outside the local small-scale network, precision of sampling time in the third master device 54 and that in each slave device 7 can be improved. Further, in the communication network according to this embodiment, a number of devices and a number of transfer paths can be reduced as compared to those in the communication network according to Embodiment 8.

It was assumed above that the general packet and the specific packet have a fixed packet length. However, even if the general packet or the specific packet has a variable length, by setting a specified period of time for inhibiting output of a specific packet to a time decided by a time required for transmission of one packet with the prespecified maximum length under control of a transmission selection circuit the same effects as described above can be achieved.

It was assumed above that the master device and the packet multiplexer are different devices. However, the same effect as that described above can be obtained if the master device and the packet multiplexer at the upper level are combined.

Further, it was assumed above that the general packet and the specific packet are different packets. However, by storing both the sampling information and the information for sampling time matching in one packet and providing a bit for determining whether the information for sampling time matching within the packet is valid or invalid the same effect as that described above can be achieved.

No comment is made for a management packet in the above description. However, by providing a management packet transreceiving circuit similar to that in Embodiment 5 in the packet switch, the same effects as those described above can be achieved in addition to the effects achieved in Embodiment 5.

With the present invention, the master device executes polling for each of the slave devices via the multiplexer, and each of the slave devices transmits specific information for starting to the master device according to a polling order and adjusts sampling time by executing a prespecified operation according to specified information for returning returned from the master device. Because of this configuration, there is provided the advantage that fluctuation in a delay in transferring a specific information from the slave device to the master device due to queuing can be eliminated.

With the present invention, general information can be transmitted at each sampling time, and because of this feature there is provided the advantage that data communications between devices can be realized.

With the present invention, under control by the master-destined information selecting unit, any one of the master-destined general information receiving unit and master-destined specific information is selected, and output therefrom to the master device is allowed according to a prespecified method. Because of this feature, there is provided the advantage that fluctuation in a transfer delay time due to a time required for packet transfer between a slave device to a master device can be eliminated.

With the present invention, a delay time in relay from a point of time when a header of specific information arrives at a slave-side port in the multiplexer under a point of time when the header of the specific information is outputted from the master-side port is always equal to a sum of a specific constant time and other constant processing delay time (such as a time for passing through a transfer path terminating circuit or the like), and there occurs no fluctuation in a delay time in relay due to queuing. With this feature, there is provided the advantage that fluctuation of a delay time in transferring specific information from the slave device to the master device due to queuing can be eliminated.

With the present invention, the transmission selecting-unit selects either one of the general information transreceiving unit and a specific information transreceiving unit, and allows output therefrom, and because of this configuration, there is provided the advantage that controls can be provided so that fluctuation in a time required for transmission from the local sampling time until transmission of specific information can be eliminated in both the master device and slave devices.

With the present invention, a delay time in processing from a point of time when the specific information transreceiving unit requests transmission until a point of time when a header of the specific information is outputted is always equal to a certain constant period of time and other constant processing time (such as a time required for passing through the transfer path terminating circuit or the like) regardless of how general information is being relayed, and there occurs no fluctuation in a delay time. Also the processing delay time is identical in both the master device and each slave device. With this feature, there is provided the advantage that precision of sampling time in the master device and in each slave device can further be improved.

With the present invention, when general information or specific information is received from a master-side port, the general information or the specific information is accumulated after input thereof into the slave-destined information receiving unit is started for a specified period of time decided by a time required for transmission of specific information, and the accumulated information is outputted from the slave-destined information receiving unit is outputted after passage of the specified period of time. With this feature, in the communication network, there is provided the advantage that a delay time in transferring specific information in the master device and that in the slave device can be matched to each other with high precision.

With the present invention, when specific information has not been received from the master-side port, output from the slave-destined general information receiving unit is allowed, and when specific information has been received from the master-side port, output of the specific information in inhibited for a specified period of time decided by a time required for transmission of the specific information after input thereof into the slave-destined specific information receiving unit is started, and further new output from the slave-destined general information receiving unit is inhibited for a specified period of time, and after passage of the specified period of time, output from the slave-destined specific information receiving unit is allowed. With this feature, in the communication network according to the present invention, there is provided the advantage that a delay time in transfer in the master device can be matched to that in the slave device with high precision, and further a delay time in transferring general information from the master device to the slave device can be reduced.

With the present invention, when the master-destined information selecting unit has received specific information from any of the slave-side ports, new output from the management information transreceiving unit is inhibited for a specified period of time, and output from the master-destined specific information receiving unit is allowed after passage of the specified period of time, and when the slave-destined information selecting unit has received specific information from the master-side port, new output from the management information transreceiving unit is inhibited for a specified period of time, and output from the slave-destined specific information receiving unit is allowed after passage of the specified period of time. With this feature, in this communication network, there is provided the advantages that, even when the packet multiplexer sends or receives management information, a delay time in transferring specific information in the master device and that in the slave device can be matched to each other with high precision.

With the present invention, each of the second multiplexers does not relay specific information and functions as a slave device with respect to a master device at a higher level and as a master device with respect to each of the devices at a lower level, and thus sampling time is adjusted to the upper device and lower device in two stages. With this feature, in this communication network, there is provided the advantage that, even when a number of slave devices increases, precision of sampling time in each slave device can be improved.

With the present invention, under controls by the master-destined information selecting unit and slave-destined information selecting unit, general information and specific information are selected, and output thereof to each device is allowed according to a prespecified method. With this feature, there is provided the advantage that specific information can be outputted at constant timing, and fluctuation of a delay time in transfer due to queuing between the slave device and master device can be eliminated.

With the present invention, a delay time in processing from a point of time when the master-side specific information transreceiving unit or slave-side specific information transreceiving unit requests transmission until a point of time when a header of the specific information is outputted from the master-side port or slave-side port is always equal to a sum of a certain specified period of time and other constant processing delay time (such as a time required for passing through the transfer path terminating circuit or the like) regardless of how general information is being relayed, and there occurs no fluctuation in a delay time due to queuing. Also there occurs no fluctuation in a delay time in transferring specific information due to a time required for queuing in the master device nor in the second multiplexer, and further there occurs no fluctuation in a delay time in transfer between the second multiplexer and slave device. Because of this feature, there is provided the advantage that, in the communication network according to the present invention, a transfer delay time in the master device can be matched to that in the second multiplexer with high precision and further a transfer delay time in the second multiplexer can be matched to that in the slave device with high precision with precision of sampling timing in each slave further improved even if a number of slave devices in the communication network increases.

With the present invention, the master device specifies each of the slave devices via a multiplexer and a third multiplexer according to a round-robin, and then each of the slave devices transmits specific information for starting according to the specified order and executes a prespecified operation according to specific information for returning returned from the master device in response to the specific information for starting for adjusting sampling time. With the feature, there is provided the advantage that, even if there are a plurality of master devices each collecting sampling information from the slave device, a delay time in transferring specific information in the master device for setting sampling time and that in each slave device can be matched to each other with high precision.

With the present invention, general information or specific information is selected under controls by the master-destined information selecting unit, slave-destined information selecting unit, and second master-destined information selecting unit, and output thereof to each device is allowed according to a prespecified method. With this feature, there is provided the advantage that output of specific information can be executed at constant timing and fluctuation in a transfer delay time due to a time required for queuing in a slave device or a master device can be eliminated.

With the present invention, a time required for relay between a master-side port and a slave-side port when relaying specific information with a third multiplexer is always equal to a sum of a constant period of time and other constant processing delay time (such as a time required for passing through the transfer terminating circuit or the like) regardless of how general information is being relayed, and there occurs no fluctuation due to a time required for queuing. Also a delay time in transferring a specific packet in the master device can be matched to that in the slave device with high precision. With this feature, in the communication network according to the present invention, there is provided the advantage that, even when a plurality of second master devices are provided each for collecting sampling information from a slave device, precision in sampling time in the master device can be matched to that in the slave device with high precision.

With the present invention, a third master device specifies each of the slave devices via a multiplexer, a fourth multiplexer, and a third multiplexer according to a round-robin, and each of the slave devices transmits specific information for starting according to the specified order and executes a prespecified operation according to specific information for returning returned from the master device in response to the specific information for starting for adjusting sampling time. With this feature, in the communication network according to the present invention, there is provided the advantage that, even when a plurality of small-scale communication network each formed with a master device and a plurality of slave devices are provided and each master device collects sampling information from a slave device within the local small-scale communication network or from that outside the local small-scale communication network, a delay time in transferring a specific packet in a master device for adjusting sampling time can be matched to that in the slave device with high precision.

With the present invention, general information or specific information is selected under controls by the master-destined information control unit, slave-destined information selecting unit, and switch-destined information selecting unit, and output thereof to each device is allowed according to a prespecified method. With this feature, there is provided the advantage that output of specific information can be executed at constant timing and fluctuation in a transfer delay time due to a time required for queuing in the slave device or in the master device can be eliminated.

With the present invention, a time required for relay between a master-side port and a slave-side port when relaying specific information with a fourth multiplexer is always equal to a sum of a constant period of time and other constant processing delay time (such as a time required for passing through the transfer terminating circuit or the like) regardless of how general information is being relayed, and there occurs no fluctuation due to a time required for queuing. Also a delay time in transferring a specific packet in the master device can be matched to that in the slave device with high precision. With this feature, in the communication network according to the present invention in which a plurality of small scale networks comprising a second master devices and a plurality of slave devices are provided and even when each sampling information is collected from the slave devices inside the small scale network or from the slave devices outside the small scale network, there is provided the advantage that precision in sampling time in the master device can be matched to that in the slave device with high precision.

With the present invention, a third master device specifies each slave device via a switch, a multiplexer, and a multiplexer according to a round-robin, and then each slave device transmits specific information for starting according to the specified order and executes a prespecified operation according to specific information for returning returned from the master device in response to the specific information for starting for adjusting sampling time. With this feature, in the communication network according to the present invention in which there are provided a plurality of small-scale communication network each formed with a master device and a plurality of slave devices and even when each master device collects sampling information from a slave device within the local small-scale communication network or that outside the local small-scale communication network, there is provided the advantage that a delay time in transferring a specific packet in the master device for setting sampling time and that in each slave device can be matched to each other with high precision.

With the present invention, general information or specific information is selected under control by the master-destined information selecting unit, second master-destined information selecting unit, and switch, and output thereof to each device is allowed according to a prespecified method. With this feature, output of specific information can be executed at constant timing, and there is provided the advantage that fluctuation in a transfer delay time due to a time required for queuing in the slave device and in the master device can be eliminated.

With the present invention, a relay time between a master-side port and a slave-side port when a switch relays specific information is always equal to a sum of a certain constant period of time and other constant processing delay time (such as a time required for passing through the transfer path terminating circuit or the like) regardless of how general information is being relayed, and there occurs no fluctuation due to a time required for queuing. Also a delay time in transferring specific information in the master device and that in the slave device can be matched to each other with high precision. With this feature, even when each of the second master devices collects sampling information from a slave device within the local small-scale network or that outside the local small-scale network, there is provided the advantage that precision of sampling time in the master device as well as that in the slave device can be improved.

With the present invention, even when general information or specific information has a variable length, a specified period of time in which output of specific information is inhibited is set to that decided by a time required for transmission of information with present maximum length according to operations of the master-destined information selecting circuit, therefore there is provided the advantage that precision of sampling time in the master device and that in each slave device can be improved.

With the present invention, the transmission selecting unit selects either one of a general information transreceiving unit and specific information transreceiving unit and allows output therefrom, therefore there is provided the advantage that output of the specific information can be controlled so that fluctuation of a delay time in transmission with an external slave device can be eliminated.

With the present invention, a delay time in an operating sequence from a point of time when the specific information receiving unit requests transmission until a point of time when header of the specific information is outputted from the transreceiving port is always equal to a certain constant period of time and other constant processing delay time (such as a time required for passing through the transfer path terminating circuit or the like), therefore there is provided the advantage that fluctuation in a sequence of operations with an external slave device can be eliminated.

With the present invention, the transmission selecting unit selects wither one of the general information transreceiving unit and specific information transreceiving unit and allows output therefrom, therefore there is provided the advantage that output of the specific information can be controlled so that fluctuation in a time required for communications with an external master device is eliminated.

With the present invention, a delay time in processing from a point of time when the specific information transreceiving unit requests transmission until a point of time when a header of the specific information is outputted from the transreceiving port is always equal to a sum of a certain constant period of time and other constant processing delay time (such as a time required to pass through the transfer path terminating circuit or the like), therefore there is provided the advantage that fluctuation in communications with an external master device can be eliminated.

With the present invention, under control by the master-destined information selecting unit, any one of the master-destined general information receiving unit and master-destined specific information receiving unit is selected, and output therefrom is allowed according to a prespecified method. With this feature, specific information can be outputted at constant timing, therefore there is provided the advantage that fluctuation in a transfer delay time due to a time required for queuing in the slave device and in the master device can be eliminated.

With the present invention, a relay delay time from a point of time when a header of specific information arrives at a slave-side port of a multiplexer until a point of time when the header of specific information is outputted from the master-side port is always equal to a certain constant period of time and other constant processing delay time (such as a time required for passing through the transfer path terminating circuit or the like) regardless of how general information is being relayed, therefore there is provided the advantage that fluctuation in a relay delay time due to a time required for queuing can be eliminated.

With the present invention, when general information or specific information is received from the master-side port, the general information or specific information is accumulated for a specified period of time decided by a particular transmission time after input of the general information or specific information is started, therefore there is provided the advantage that the accumulated information can be outputted from the slave-destined information receiving unit after passage of the specified period of time.

With the present invention, when specific information has not been received from the master-side port, output from the slave-destined general information receiving unit is allowed, and when specific information has been received from the master-side port, output of specific information is inhibited for a specified period of time decided by a particular transmission time after input to the slave-destined specific information receiving unit is inhibited, and further new output from the slave-destined general information receiving unit is inhibited for a specified period of time, and then output from the slave-destined specific information receiving unit is allowed after passage of the specified period of time. With this feature there is provided the advantage that, a delay time in transferring the specific information in an external master device and that in the slave device can be matched to each other with high precision, and further a delay time in transferring general information from the master device to the slave device can be reduced.

With the present invention, when the master-destined information selecting unit has received from any of the slave-side ports, new output from the management information transreceiving unit is inhibited for a specified period of time, and output from the master-destined specific information receiving unit is allowed after passage of the specified period of time, and further when the slave-destined information selecting unit has received from the master-side port, new output from the management information transreceiving unit is inhibited for a specified period of time, and output from the slave-destined specific information receiving unit is allowed after passage of the specified period of time. With this feature there is provided the advantage that, when a packet multiplexer sends or receives management information, a delay time in transferring specific information in the slave device and that in the master device can be matched to each other with high precision.

With the present invention, under controls by the master-destined information selecting unit and slave-destined information selecting unit, general information and specific information are selected and output thereof to each device is allows according to a prespecified method. With this feature, specific information can be outputted at constant timing, therefore there is provided the advantage that fluctuation in a transfer delay time due to a time required for queuing in the slave device and that in the master device can be eliminated.

With the present invention, a delay time in processing from a point of time when the master-side specific information transreceiving unit or slave-side specific information transreceiving unit requests transmission until a point of time when a header of the specific information is outputted from the master-side port or slave-side port is always equal to a certain constant period of time and other constant processing delay time (such as a time required for passing through the transfer path terminating circuit or the like) regardless of how general information is being relayed, therefore there is provided the advantage that fluctuation in a delay time due to a time required for queuing can be eliminated.

With the present invention, under controls by the master-destined information selecting unit, slave-destined information selecting unit, and second master-destined information selecting unit, general information and specific information are selected, and output thereof to each device is allowed according to a prespecified method. With this feature, output of specific information can be executed at constant timing, therefore there is provided the advantage that a transfer delay time due to a time required for queuing in the slave device and in the master device can be eliminated.

With the present invention, a relay time between the master-side port and slave-side port when relaying specific information with a third multiplexer is always equal to a sum of a certain constant period of time and other constant processing delay time (such as a time required for passing through the transfer path terminating circuit or the like)

regardless of how general information is being relayed, therefore there is provided the advantage that fluctuation in a delay time due to a time required for queuing can be eliminated.

With the present invention, under controls by the master-destined information control unit, slave-destined information selecting unit, and switch-destined selecting unit, general information or specific information is selected and output thereof to each device is allowed according to a prespecified method. With this feature, output of specific information can be executed at constant timing, therefore there is provided the advantage that fluctuation in a transfer delay time due to a time required for queuing in the slave and in the master device can be eliminated.

With the present invention, a relay time between the master-side port and slave-side port when relaying specific information with a fourth multiplexer is always equal to a sum of a certain constant time and other constant processing time (such as a time required for passing through the transfer path terminating circuit or the like) regardless of how general information is being relayed), therefore there is provided the advantage that fluctuation in a delay time due to a time required for queuing can be eliminated.

With the present invention, under controls by the master-destined information control, second master-destined information selecting unit and switch, general information and specific information are selected, and output thereof to each device is outputted according to a prespecified method. With this feature, output of specific information can be executed at constant timing, therefore there is provided the advantage that a transfer delay time due to a time required for queuing in the slave device and in the slave device can be eliminated.

With the present invention, a relay time between the master-side port and slave-side port when relaying specific information with a switch is always equal to a sum of a certain constant period of time and other constant processing delay time (such as a time required for passing through the transfer path terminating circuit or the like), therefore there is provided the advantage that fluctuation in a delay time due to a time required for queuing can be eliminated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication network comprising:
   a master device and a plurality of slave devices connected to each other through at least one multiplexer in a tree configuration with the master device at the vertex for transmitting and receiving various types of specific information having a fixed length to and from each ones of the plurality of slave devices; wherein
   said master device specifies any of the slave devices via the multiplexer according to a round-robin polling order, the multiplexer includes a master destined information selecting unit and then
   the specified slave device transmits the specific information for starting communications with the master device, the specific information being used for matching the sampling time in said master device and executes specific calculations according to the specified information for returning said specific information from said master device according to the specific information for starting;
   wherein the delay time in transferring the specific information from the slave device through the at least one multiplexer to the master device and vice versa is controlled by the master destined information selecting unit so that the delay time is substantially constant from each relay point within the at least one multiplexer.

2. The communication network according to claim 1; wherein each of said slave devices and said master device transmits general information sampled at each of the matched sampling times and having a fixed length in addition to the specific information for starting at a predetermined cycle and specific information for returning at a predetermined cycle.

3. The communication network according to claim 2; wherein said multiplexer comprises:
   a master-side port for connecting said master device thereto and slave-side ports for connecting the plurality of slave devices thereto for mutual communication;
   a plurality of master-destined general information receiving units for receiving the general information from said slave-side ports;
   a master-destined specific information receiving unit for receiving the specific information for starting from each of said slave-side ports and managing the specific information in batch;
   a slave-destined broadcasting bus for broadcasting information obtained from said master-side port to all of said slave-side ports; and
   a master-destined information multiplexing bus for outputting the information allowed by said master-destined information selecting unit to said master-side port; and wherein
   the master-destined information selecting unit selects any one of said master-destined general information receiving units or said master-destined specific information receiving unit and allows output to said master device in a different manner according to whether the information from the slave-side ports is the general information or the specific information.

4. The communication network according to claim 3 wherein said master-destined information selecting unit
   allows output from said plurality of master-destined general information receiving units according to a round-robin when the specific information is not received from said slave-side port;
   inhibits outputs of the specific information for a specified period of time decided by a time required for transmitting the information with a fixed length after start of input into said master-destined specific information receiving unit when the specific information is received from any of said slave-side ports; and further
   inhibits new output from said plurality of master-destined general information receiving units for the specified period of time and allows output from said master-destined specific information receiving unit after passage of the specified period of time.

5. The communication network according to claim 3; wherein each of said master device and said slave device comprises:
   a general information transreceiving unit for transmitting or receiving the general information;
   a specific information transreceiving unit for transmitting or receiving the specific information;
   a transmission selecting unit for selecting any one of said general information transreceiving unit or said specific information transreceiving unit and allowing output therefrom in a different manner according to whether a transmission request is received from the general information transreceiving unit or from the specific information transreceiving unit; and executes communications with said multiplexer to which it is connected via a transreceiving port.

6. The communication network according to claim 5; wherein said transmission selecting unit allows output from said general information transreceiving unit when a specific information sending request has not been received from said specific information transreceiving unit;

inhibits output from said specific information transreceiving unit only for a specified period of time required for transmission of the information with a fixed length after the request is received when the specific information sending request has been received from said specific information transreceiving unit; and further inhibits new output from said general information transreceiving unit for the specified period of time and then allows output from said specific information transreceiving unit after passage of the specified period of time.

7. The communication network according to claim 3; wherein said multiplexer unit comprises:

a slave-destined information receiving unit for receiving information from said master-side port; and a slave-destined information control unit for allowing output from said slave-destined information receiving unit after providing a delay wherein the slave-destined information control unit accumulates the general information or the specific information, when the general information or the specific information has been received from said master-side port, for a specified period of time decided by a period of time required for transmission of the information with a specified length after input into said slave-destined information receiving unit is started, and outputs the accumulated information from said slave-destined information receiving unit after passage of the specified period of time.

8. The communication network according to claim 3; wherein said multiplexer comprises:

a slave-destined general information receiving unit for receiving the general information from said master-side port;

a slave-destined specific information receiving unit for receiving the specific information from said master-side port; and a slave-destined information selecting unit for selecting any one of said slave-destined general information receiving unit or said slave-destined receiving unit and allowing output to said slave devices in a different manner according to whether the general information is stored in the slave-destined general information receiving unit or the specific information is stored in the slave-destined specific information receiving unit; wherein said multiplexer allows output from said slave-destined general information receiving unit when the specific information has not been received from said master-side port;

said multiplexer inhibits output of the specific information when the specific information has been received from the master-side port for a specified period of time decided by a time required for transmission of the information with a fixed length after input to said slave-destined specific information receiving unit is started, and further said multiplexer inhibits new output from said slave-destined general information receiving unit for the specified period of time and allows output from said slave-destined specific information receiving unit after passage of the specified period of time.

9. The communication network according to claim 8; wherein said master device and each of said slave devices transmits management information with a fixed length to a target device at a predetermined cycle; and said multiplexer further comprises:

a management information transreceiving unit for transmitting or receiving the management information; and said plurality of master-destined information selecting units inhibit new output from said management information transreceiving unit for the specified period of time when the specified information has been received from any of said slave-side ports, and allows output from said master-destined specific information receiving unit after passage of the specified period of time, and further said slave-destined information selecting unit inhibits new output from the management information transreceiving unit for the specified period of time when the specific information has been received from said master-side port, and allows output from said slave-destined specific information receiving unit after passage of the specified period of time.

10. The communication network according to claim 8; wherein, at least one multiplexer is replaced with a second multiplexer constituting a small-scale communication network;

said at least one second multiplexer is connected via said multiplexer with said master device at the vertex, and one or more multiplexers are connected to each of said second multiplexer according to necessity with a plurality of said slave devices connected thereto in a tree configuration; and each of said second multiplexers does not relay the specific information, and behaves as a slave device with respect to a master device at an upper level, and also behaves as a master device with respect to each of the slave devices at a lower level;

said master device specifies said second multiplexer according to a round-robin polling order, and each of said second multiplexer transmits the specific information for starting communications with the master device, the specific information being used for matching the sampling time to said master device according to a specified order and executes a prespecified operation according to the specific information for returning said specific information from said second multiplexer in response to the specific information for starting and to match the sampling time; and further each of said second multiplexer specifies each of said slave devices via said multiplexer according to a round-robin polling order, and each of said slave devices transmits information for starting and used for matching the sampling time to said second multiplexer via said multiplexer according to the specified order and also executes a specified operation according to the specific information for returning said specific information from said second multiplexer in response to the specific information for starting and to match the sampling time.

11. The communication network according to claim 10; wherein said second multiplexer comprises:
a master-side specific information transreceiving unit for transmitting or receiving the specific information from said master-side port in place of said master-destined specific information receiving unit in said multiplexer; and
a slave-side specific information transreceiving unit for transmitting or receiving the specific information from said slave-side port in place of said slave-destined information receiving unit in said multiplexer.

12. The communication network according to claim 11; wherein
said master-destined information selecting unit inhibits output from said master-side specific information transreceiving unit for the specified period of time when a specific information sending request has been received from said master-side specific information transreceiving unit; and
inhibits new output from said master-destined general information receiving unit for the specified period of time and allows output from said master-side specific information transreceiving unit after passage of the specified period of time; and
said slave-destined information selecting unit
inhibits output from said slave-side specific information transreceiving unit for the specified period of time when a specific information sending request has been received from said slave-side specific information transreceiving unit;
inhibits new output from said slave-destined general information receiving unit for the specified period of time and then allows output from said slave-side specific information transreceiving unit after passage of the specified period of time.

13. The communication network according to claim 8; wherein, at least one packet multiplexer is replaced with a third multiplexer constituting a small-scale communication network;
at least one of said third multiplexers is connected thereto via said multiplexer with said master device at the vertex, and further a plurality of said slave devices are connected via said third multiplexer and one or more multiplexers according to necessity in a tree configuration with a second master device functioning as a master device in the small-scale communication network provided at the vertex;
said master device specifies each of said slave devices via said multiplexer and said third multiplexer according to a round-robin polling order, and each of said slave devices transmits the specific information for starting and used for matching the sampling time to said master device according to the specified order, and executes a specified operation according to the specified information for returning said specified information from said master device in response to the specific information for starting and to match the sampling time.

14. The communication network according to claim 13; wherein
said third multiplexer has a second master-side port for connecting said second master device thereto for mutual communications, and further comprises, in addition to components of the multiplexer,
a second master-side master-destined general information receiving unit for receiving the general information from said second master-side port to said master-side port;
a second master-side slave-destined general information receiving unit for receiving the general information from said second master-side port to said slave-side port;
a master-side second master-destined general information receiving unit for receiving the general information from said master-side port to said second master-side port;
a slave-side second master-destined general information receiving unit for receiving the general information from said slave-side port to the second master-side port;
a second master-destined information selecting unit for selecting any one of said master-side second master-destined general information receiving unit or said slave-side second master-destined general information receiving unit and allowing output therefrom; and
a second master-destined information multiplexing bus for outputting information allowed by said second master-destined information selecting unit to said second master-side port.

15. The communication network according to claim 14; wherein said master-destined information selecting unit
inhibits outputs of the specified information for the specified period of time when the specific information has been received from any of said slave-side ports;
inhibits new output from a plurality of said master-destined general information receiving units as well as from said second master-side master-destined general information receiving unit for the specified period of time and allows output from said master-destined specific information receiving unit for passage of the specified period of time; and
said slave-destined information selecting unit
inhibits output of the specific information for the specified period of time when the specific information has been received from said master-side port;
inhibits new output from said slave-destined general information receiving unit as well as from said second master-side slave-destined general information receiving unit for the specified period of time and allows output from the slave-destined specific information receiving unit after passage of the specified period of time; and
said second master-destined information selecting unit allows output from said master-side second master-destined general information receiving unit as well as from said slave-side second master-destined general information receiving unit according to a round-robin.

16. The communication network according to claim 13; wherein, in place of said master device, there are provided:
a switch for switching the general information;
a third master device for transmitting or receiving the specified information; and
at least one fourth multiplexer connected to said switch; and
said third master device specifies each of said slave devices via said multiplexer, said fourth multiplexer, and said third multiplexer according to a round-robin polling order, and then each of said slave devices transmits the specific information for starting used for matching the sampling time to said master device according to a specified order and executes a specified operation according to the specific information for returning returned from said master device in response to the specific information for starting to match the sampling time.

17. The communication network according to claim 16; wherein said fourth multiplexer has a switch-side port for connecting the switch thereto to relay mutual communications, and comprises:

a switch-destined general information receiving unit in place of said plurality of master-destined general information receiving units for discretely receiving the general information from each of said slave-side ports;

a switch-side slave-destined general information receiving unit in place of said slave-destined general information receiving unit for receiving the general information from said switch-side port; and a third master-destined information control unit for controlling said master-destined specific information receiving unit and allowing output to said third master device according to a specified method in place of said master-destined information selecting unit; and further comprises, in addition to components of the multiplexer, a switch-destined information selecting unit for selecting one of said switch-destined information receiving units and allowing output therefrom.

18. The communication network according to claim 17; wherein said master-destined information control unit accumulates the specified information in said master-destined specific information receiving unit for the specified period of time when the specified information has been received from said slave-side port, and outputs the specified information from said master-destined information receiving unit after passage of the specified period of time; and said switch-destined information selecting unit allows output from said switch-destined general receiving unit according to a round-robin polling order; and said slave-destined information selecting unit inhibits output from said slave-destined specific information receiving unit for the specified period of time when the specific information has been received from said master-side port, inhibits new output from said slave-destined general information receiving unit for the specified period of time, and allows output from said slave-destined specific information receiving unit after passage of the specified period of time.

19. The communication network according to claim 13; wherein, in place of said master device, there are provided:

a switch for switching the general information and the specific information; and a third master device for transmitting or receiving the specific information; and said third master device specifies each of said slave devices via said switch, said multiplexer, and said third multiplexer according to a round-robin polling order, and then each of said slave devices transmits specific information for starting used for matching the sampling time to said master device and executes a specified operation according to the specific information for returning returned from said master device according to the specific information for starting to match the sampling time.

20. The communication network according to claim 19; wherein said switch comprises a switching unit for outputting information allowed by said master-destined information control unit to a slave-side port as an destination in place of said a slave-destined general information receiving unit, said master-side second master-destined general information receiving unit, said second master-side master-destined general information receiving unit, said second master-side slave-destined general information receiving unit, said master-destined general information receiving unit, said second master-side port, said broadcasting bus, said multiplexing bus, and said second master-destined information multiplexing bus in said third multiplexer.

21. The communication network according to claim 20; wherein said master-destined information control unit accumulates the specified information in said master-destined specific information receiving unit for the specified period of time when the specified information has been received from said slave-side port and outputs the specific information from said master-destined specific information receiving unit after passage of the specified period of time; and said second master-destined information selecting unit inhibits output from said slave-destined specific information receiving unit for the specified period of then when the specific information has been received from said master-side port;

inhibits new output from said second master-destined general information receiving unit for the specified period of time and allows output from said slave-destined specific information receiving unit after passage of the specified period of time.

22. The communication network according to claim 4; wherein information transmitted from or received by each device is variable in the length, and the specified period of time during which output of the specific information from each device is inhibited is restricted within a time frame decided by a time prespecified for transmitting information with the maximum length.

* * * * *